US006788844B2

(12) United States Patent
Ng

(10) Patent No.: US 6,788,844 B2
(45) Date of Patent: Sep. 7, 2004

(54) ALL-OPTICAL DYNAMIC GAIN EQUALIZER

(75) Inventor: Eddie Kai Ho Ng, Ottawa (CA)

(73) Assignee: Tropic Networks Inc., Kanata (CA)

( * ) Notice: Subject to any disclaimer, the term of this patent is extended or adjusted under 35 U.S.C. 154(b) by 301 days.

(21) Appl. No.: 10/087,863

(22) Filed: Mar. 5, 2002

(65) Prior Publication Data

US 2003/0048984 A1 Mar. 13, 2003

Related U.S. Application Data

(60) Provisional application No. 60/317,939, filed on Sep. 10, 2001.

(51) Int. Cl.[7] .............................. G02B 6/28; G02B 6/26
(52) U.S. Cl. ........................ 385/24; 398/149; 398/180; 359/337.1; 359/349
(58) Field of Search ....................... 385/24, 15; 398/79, 398/82, 69, 64, 37, 149, 180; 359/337.1

(56) References Cited

U.S. PATENT DOCUMENTS

| | | | | |
|---|---|---|---|---|
| 5,422,968 A | * | 6/1995 | Hanatani et al. | 385/24 |
| 5,701,371 A | * | 12/1997 | Ishida | 385/24 |
| 6,148,124 A | * | 11/2000 | Aksyuk et al. | 385/24 |
| 6,222,956 B1 | * | 4/2001 | Akiba et al. | 385/24 |
| 6,418,249 B1 | * | 7/2002 | Nakamura et al. | 385/24 |
| 6,477,293 B1 | * | 11/2002 | Golub | 385/24 |
| 6,552,844 B2 | * | 4/2003 | Lim | 359/337.1 |
| 6,597,830 B1 | * | 7/2003 | Nakabayashi et al. | 385/24 |
| 6,636,657 B1 | * | 10/2003 | Aksyuk et al. | 385/24 |
| 6,697,193 B1 | * | 2/2004 | Meli et al. | 359/349 |
| 2001/0022874 A1 | * | 9/2001 | Yamaguchi | 385/15 |
| 2002/0057875 A1 | * | 5/2002 | Kaneko | 385/24 |
| 2002/0118915 A1 | * | 8/2002 | Sagan | 385/24 |
| 2003/0214703 A1 | * | 11/2003 | Ovadia et al. | 359/344 |
| 2003/0223728 A1 | * | 12/2003 | Maeda et al. | 385/15 |

FOREIGN PATENT DOCUMENTS

| | | |
|---|---|---|
| EP | 1 098 219 A1 * | 5/2001 |
| JP | 10-13357 A * | 1/1998 |

OTHER PUBLICATIONS

Powering Optical Communications, SDL PIRI V–MUX Series, Jan. 10, 2001.
P.Yeh; Optical Waves in Layered Media; (Wiley Series in Pure & Applied Optics), May 1998.
Brzozowski, L.; Sargent, E.H.; All–Optical Analog–to–Digital Converters, Hardlimiters, and Logic Gates, Journal of Lightwave Technology, vol. 19, No. 1, Jan. 2001.
Brzozowski, L; Sargent, E.H.; Nonlinear Disordered Media for Broad–Band Optical Limiting, IEEE Journal of Quantum Electronics, vol. 36, No. 11, Nov. 2000.
Justus, B.L.; Huston, A.L., Campillo, A.J.; Broadband Thermal Optical Limiter, Applied Physics Letters 63(11), Sep. 13, 1993, pp 1483 to 1485.
Sun, X.; Yu, R.Q.; Xu, G.Q.; Hor, T.S.A.; Ji, W.; Broadband Optical Limiting with Multiwalled Carbon Nanotubes, Applied Physics Letters, vol. 73, No. 25, Dec. 21, 1998.

(List continued on next page.)

Primary Examiner—Jared J. Fureman
(74) Attorney, Agent, or Firm—Victoria Donnelly

(57) ABSTRACT

The present invention provides an all-optical dynamic gain equalizer of an open-loop design using nonlinear optical materials for equalizing channel power without the need of complex electronics and close-loop control, and provides pulse reshaping and in some embodiments noise reduction at no extra cost. The invention achieves restoration of spectral power uniformity by employing nonlinear optical limiters with desirable power transfer function curves to each of the optical signals to be equalized. The invention provides the highly desirable functions of dynamic gain equalization, and optical pulse reshaping. Some embodiments constructed according to the invention provide signal dynamic range control by biasing the nonlinear optical limiter with a biasing optical signal.

23 Claims, 11 Drawing Sheets

OTHER PUBLICATIONS

Roberts, M.J.; Stenger–Smith, J.D.; Zarras, P.; Lindsay, G.A.; Hollins, R.A.; Chafin, A.P.; Yee, R.Y.; Wynne, Kenneth J.; Processing Assisted Self Assembly of Nonlinear Optical Polymers, IEEE, 1998, pp 3–4, no month available.

Rangel–Rojo, R.; Yamada, S.; Matsuda, H.; Large Near–Resonance Third–Order Polymers Nonlinearity in an Azobenzene–Functionalized Polymer Film, Applied Physics Letters, vol. 72, No. 9, Mar. 2, 1998.

Mendonca, C.R.; Costa, M.M.; Giacometti, J.A.; Nunes, F.D.; Zilio, S.C.; Nonlinear Refractive Indices of Polystyrene Films Doped with Azobenzene Dye Disperse Red I, IEEE Electronics Letters, vol. 34, No. 1, $8^{th}$ Jan 1998.

Cha, M.; Sariciftci, N.S.; Heeger, A.J.; Hummelen, J.C.; Wudl, F.; Enhanced Nonlinear Absorption and Optical Limiting in Semiconducting Polymer/Methanofullerene Charge Transfer Films, Applied Physics Letters 67 (26), Dec. 25, 1995.

Xia, T.; Hagan, D.J.; Dogariu, A.; Said, A.; Van Stryland, E.W.; Optimization of Optical Limiting Devices Based on Excited–State Absorption, Applied Optics, vol. 36, No. 18, Jun. 20, 1997.

Shirk, J.S.; Pong, R.G.S.; Bartoli, F.J.; Snow, A.W.; Optical Limiter Using a Lead Phthalocyanine, Applied Physics Letter, vol. 63, No. 14, Oct. 4, 1993.

Song, Y.; Fang, G. Wang, Y.; Liu, S.; Li, C.; Excited–State Absorption and Optical–Limiting Properties of Organometallic Fullerene–$C_{60}$ Derivatives, Applied Physics Letters, vol. 74, No. 3, Jan. 18, 1999.

Brzozowski L.; Sargent, E.H.; Optical Signal Processing Using Nonlinear Distributed Feedback Structures, IEEE Journal of Quantum Electronics, vol. 36, No. 5, May 2000.

Brzozowski, Lukasz; Sargent, Edward H.; Azobenzene for Photonic Network Applications: Third–Order Nonlinear Optical Properties; Department of Electrical and Computer Engineering, University of Toronto, pp 1–21, Table 1: Nonlinear Material Properties for Azobenzene Dyes, Figures 1–7, no date available.

Miles, Perry; Bottleneck Optical Pulse Limiters Revisited; Applied Optics, vol. 38, No. 3, Jan. 20, 1999, pp 566–570.

Sun, Wenfang; Bycon, Clare C.; Lawson, Chris M.; Gray, Gary M.; Third–Order Nonlinear Optical Properties of an Expanded Porphyrin Cadmium Complex; Applied Physics Letters, vol. 77, No. 12, Sep. 18, 2000, pp 1759–1761.

* cited by examiner

ALL-OPTICAL DYNAMIC GAIN EQUALIZER

This application claims benefit of No. 60/317,939 filed Sep. 10, 2001.

FIELD OF THE INVENTION

The invention relates to optical signal equalization and reshaping and more particularly to dynamic gain equalization and reshaping of optical signals in WDM (wavelength division multiplexed) systems.

BACKGROUND OF THE INVENTION

In a long haul optical network, in order to maintain operating signal power over large distances of fiber span, optical signals are amplified at various amplifier sites along the fiber span. In WDM systems, multiple channels of different wavelengths can be used to transmit multiple streams of information along a single optical waveguide. This multichannel transmission is subject to degradation and attenuation over long fiber spans, and periodically retransmission can be used to restore signal quality and strength. Amplification is used to reduce costs incurred by multichannel retransmission. Typically this is achieved purely in the optical domain through EDFAs (Erbium doped fiber amplifiers) which amplify the light of the various channels of the WDM system passing through the amplifier. Despite the tremendous recent success in the deployment of EDFAs in WDM networks, EDFA amplification exhibits wavelength dependency which has become a significant problem in optical systems design.

Spectral power uniformity is crucial to maintain operational stability in a WDM optical network. Spectral variations in the gain of an amplifier distort the spectrum of a multichannel transmitter. Since EDFAs saturate in a largely homogeneous manner, strong and weak channels going into an amplifier compete for pumped Erbium ions. The result is that some channels will grow at the expense of the others, an effect which is even more prominent when optical amplifiers are cascaded. In fact, the ratio of the power in the high-gain channels to that of the low-gain channels will increase exponentially with the number of amplifiers in the chain, potentially causing significant channel-to-channel variations in signal-to-noise ratio in long span systems. Since optical nonlinearities limit the maximum power that can be put into a particular channel, large differences in channel powers make it difficult to keep the weaker channels above the receiver power threshold. Furthermore, large power imbalances can enhance cross-talk from strong to weak channels and may cause receiver dynamic range problems. These problems can be rectified if the relative channel power can be equalized. With the cascading of multiple non-uniform gain of EDFAs for extended geographic reach and channel flexible add/drop capability, dynamic gain equalization is urgently needed.

In long haul systems, gain equalization is typically implemented on a per amplifier basis. To avoid large power imbalances caused by cascaded EDFAs, gain equalization usually occurs in conjunction with amplification, occurring after each amplification stage so that each time a signal is amplified, it is also equalized. Typically, dynamic gain equalization is employed only every few amplifiers while at the remaining amplifiers, signals undergo static gain equalization. One current static equalization solution is to use a filter with a frequency spectrum which matches the inverse of the EDFA frequency profile. Since the EDFA frequency profile changes with the amplitude of the incident signal, a dynamic solution really is required to compensate for the EDFA power imbalances. The current general approach to dynamic gain equalization is to demultiplex the WDM multichannel signal, equalize the channels by attenuating them individually, and then multiplexing them back into a WDM multichannel signal.

Current implementations of dynamic gain equalization using this approach involve complex controlling electronics utilizing a closed loop design which monitors signals and varies the attenuation of the power of optical signals in order to equalize them. These suffer from poor spectral uniformity/flatness, poor accuracy, long response time, are typically bulky, and are made up of components which are not compactly integrated. Due to the use of electronics for control, often there is a long development life cycle, additional required man-power, and various extra associated costs.

Examples of some of the current solutions are planar lightwave circuits (PLCs) using thermally controlled eVOAs (electronic variable optical attenuators) and AWGs (arrayed waveguide gratings), Mach-Zehnder Interferometers, and MEMs (micro-electrical mechanical switches). Other solutions are free spaced optics based and usually take a liquid crystal approach.

All of these solutions essentially take the approach of attenuating the optical signals, measuring the power of the transmitted signals and in a control loop varying the attenuation to achieve equalization. If the power of the signals were to drift, the complex electronics would vary the attenuation of the signals to a new configuration so that equalization could be achieved. This has inherent response time, and accuracy problems. The response time will be a function of complex electronics used to measure the signal power and logically control the attenuation in a feedback loop until a desired measured power is achieved. In terms of accuracy, the accuracy of equalization does not only depend upon accuracy and calibration of the equalizing elements of the apparatus but also depends upon the accuracy and calibration of the measuring elements of the apparatus. The limitations of the measuring elements, in the closed loop design contribute to the inaccuracy and non-uniformity of equalization. Due in large part to the complex electronics involved in the closed loop design integration on a PLC is not feasible and the result is often bulky, expensive to develop, construct and maintain.

It would be desirable if a channel power equalizer were provided that did not use close-loop control requiring complex electronics, that allowed integration of higher complex functions on a Photonic Lightwave Circuit (PLC), that provided better optical performance such as spectral uniformity, accuracy, and response time, and that was considerably more compact in size.

SUMMARY OF THE INVENTION

The present invention provides a dynamic gain equalizer of an open-loop design using nonlinear (NL) optical materials for equalizing channel power. The invention achieves restoration of spectral power uniformity by employing nonlinear optical limiters with desirable power transfer function curves to each of the optical signals to be equalized. Pulse reshaping is provided at no extra cost by power transfer curves which provide a limit transmission power and preferably a steeper region where the curve has a slope of greater than one, which respectively serve to clip pulses at a maximum power and correct the sides of the pulses by stretching. The invention combines the highly desirable functions of dynamic gain equalization, optical pulse reshaping, and in some embodiments noise reduction. Some embodiments constructed according to the invention provide signal dynamic range control by biasing the nonlinear optical limiter with a biasing optical signal.

According to a first broad aspect, the invention provides for an apparatus for equalizing channel powers of a multichannel optical signal having an optical demultiplexer for demultiplexing the multichannel optical signal into a plurality of single channel optical signals, for each single channel optical signal a respective nonlinear optical limiter which is designed to limit the single channel optical signal to produce a limited single channel optical signal, and an optical multiplexer for multiplexing the limited single channel optical signals to produce an equalized multichannel optical signal.

In some embodiments of the invention, each nonlinear optical limiter has a limit transmission power such that the limited single channel optical signal is limited to a power less than or equal to the limit transmission power.

In some embodiments of the invention, the limit transmission powers of the nonlinear optical limiters are equal.

In some embodiments of the invention, each nonlinear optical limiter is designed to produce a limited single channel optical signal according to an optical limiting power transfer curve applied to the respective single channel optical signal, the optical limiting power transfer curve providing a piecewise increasing monotonic transmitted power function portion when incident light upon the nonlinear optical limiter has a power less than an incident light critical power, and providing a relatively flat transmitted power function portion when incident light upon the nonlinear optical limiter has a power greater than the incident light critical power, and in which the limit transmission powers of the nonlinear optical limiters are defined by said relatively flat transmitted power function portion.

Some embodiments of the invention provide for the piecewise increasing monotonic transmitted power function portion having a steeper transmitted power function portion having a slope of greater than one by which sides of optical pulses of the respective single channel optical signal are corrected.

Some embodiments of the invention provide for the piecewise increasing monotonic transmitted power function portion having a transmitted power function portion which limits the power of the respective single channel optical signal to an insignificant transmission power for incident light upon the nonlinear optical limiter having a power less than an incident light power threshold, wherein the incident light power threshold is less than said incident light critical power.

Some embodiments of the invention provide for an amplifier for amplifying the multichannel optical signal.

In some embodiments of the invention, the optical demultiplexer is adapted to amplify the multichannel optical signal.

Some embodiments of the invention provide for each single channel optical signal a respective bias optical signal source providing to the nonlinear optical limiter a respective bias optical signal of a wavelength different from leach of the single channel optical signals, each bias optical signal having a power, each limited single channel optical signal having a power which has a dynamic range, in which the power of each bias optical signal controls the dynamic range of the power of the respective limited single channel optical signal produced by the respective nonlinear optical limiter.

Some embodiments of the invention provide for each single channel optical signal a respective optical combiner in which each optical combiner combines the respective single channel optical signal with the respective bias optical signal before they are input into the respective nonlinear optical limiter.

Some embodiments of the invention provide for an isolator adapted to absorb any power of the single channel optical signals which are reflected from the respective nonlinear optical limiter. Other embodiments of the invention provide for each single channel optical signal a respective isolator adapted to absorb any power of the single channel optical signals which are reflected from the respective nonlinear optical limiter.

In some embodiments of the invention, the nonlinear optical limiters are absorptive nonlinear optical limiters.

In some embodiments of the invention, the nonlinear optical limiters are Bragg gratings comprising nonlinear Kerr materials.

Some embodiments of the invention provide for an equalization analyzer and a bias power controller in which the equalization analyzer determines a respective power measurement for each limited single channel optical signal, the bias power controller controlling the power of each bias optical signal as a function of the power measurements.

According a second broad aspect the invention provides for an apparatus for equalizing channel powers of a multichannel optical signal having an optical demultiplexer for demultiplexing the multichannel optical signal into a plurality of single channel optical signals, a broadband nonlinear optical limiter having a respective separate spatial area for each single channel optical signal, the respective separate spatial area adapted to limit the single channel optical signal to produce a limited single channel optical signal, and an optical multiplexer for multiplexing the limited single channel optical signals to produce an equalized multichannel optical signal.

In some embodiments of the invention, each separate spatial area has a limit transmission power such that the limited single channel optical signal is limited to a power less than or equal to the limit transmission power.

In some embodiments of the invention, the limit transmission powers of the separate spatial areas are equal.

Some embodiments of the invention provide for an amplifier for amplifying the multichannel optical signal.

Some embodiments of the invention provide for an isolator adapted to absorb any power of the single channel optical signals which are reflected from the broadband nonlinear optical limiter.

In some embodiments of the invention, the broadband nonlinear optical limiter is a broadband Bragg grating comprising nonlinear Kerr materials.

According to a third broad aspect, the invention provides for a method of equalizing channel powers of a multichannel optical signal including demultiplexing the multichannel optical signal into a plurality of single channel optical signals, for each single channel optical signal, producing a limited single channel optical signal using a respective nonlinear optical limiter which is adapted to limit the single channel optical signal, and multiplexing the limited single channel optical signals to produce an equalized multichannel optical signal.

Some embodiments of the invention provide for amplifying the multichannel optical signal, before the step of demultiplexing.

Some embodiments of the invention provide for each single channel optical signal, providing to the respective nonlinear optical limiter a respective bias optical signal of a wavelength different from each of the single channel optical signals, each bias optical signal having a power, each limited single channel optical signal having a power which has a dynamic range, and controlling the power of each bias optical signal to control the dynamic range of the power of the respective limited single channel optical signal.

Some embodiments of the invention provide for combining the respective single channel optical signal with the respective bias optical signal before producing the limited single channel optical signal.

Some embodiments of the invention provide for absorbing any power of the single channel optical signals which are reflected from the nonlinear optical limiters.

Some embodiments of the invention provide for determining a respective power measurement for each limited single channel optical signal, and controlling the power of each bias optical signal as a function of the power measurements.

According to a fourth broad aspect, the invention provides for a method of equalizing channel powers of a multichannel optical signal including demultiplexing the multichannel optical signal into a plurality of single channel optical signals, for each single channel optical signal, producing a limited single channel optical signal using a broadband nonlinear optical limiter having a respective separate spatial area for each single channel optical signal, the respective separate spatial area adapted to limit the single channel optical signal, and multiplexing the limited single channel optical signals to produce an equalized multichannel optical signal.

Some embodiments of the invention provide for absorbing any power of the single channel optical signals which are reflected from the broadband nonlinear optical limiter.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 1:
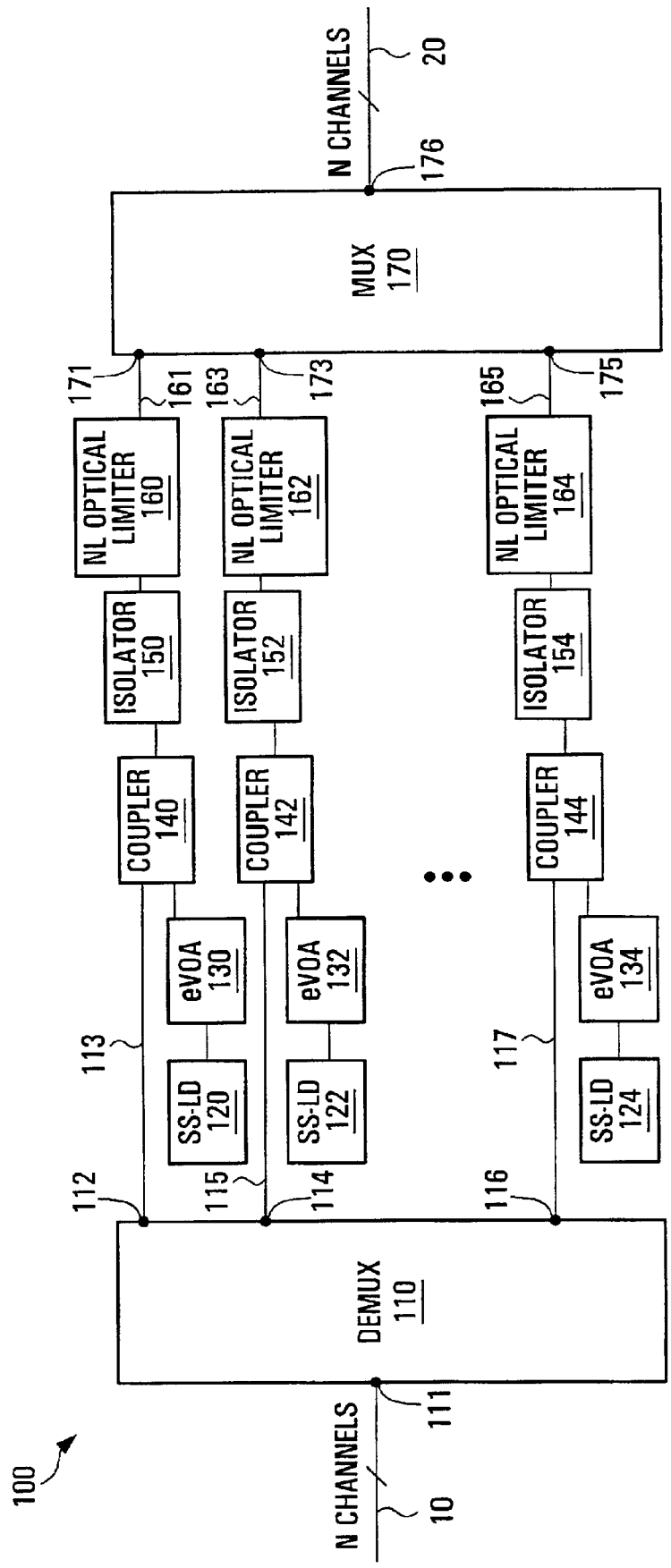
FIG. 1 is a block diagram of a biased optical dynamic gain equalizer provided by an embodiment of the invention.

Referring to FIG. 1, an optical open loop dynamic gain equalizer (DGE) generally indicated by 100 constructed according to an embodiment of the invention is described. This embodiment provides the greatest flexibility and widest dynamic range of the embodiments presented, employing an array of eVOAs, solid state laser-diodes (SS-LD), and isolators.

Preferably, the DGE 100 is implemented on a PLC although more generally may be implemented otherwise.

An input fiber span 10 carrying N multiplexed WDM channels of respective wavelengths $\lambda_1, \ldots, \lambda_N$ is connected to an input 111 of a demultiplexer (DEMUX) 110. The input 111 also serves as an input of the optical open loop DGE 100. The DEMUX 110 has N outputs 112, 114, . . . , and 116 connected respectively to N waveguide portions 113, 115, . . . , and 117 which are respectively connected to first inputs of N combiners 140, 142, . . . , and 144. Outputs from N solid state laser diodes 120, 122, . . . , and 124 are connected to inputs of N eVOAs 130, 132, . . . , and 134 respectively. The laser diodes may generate a significant amount of heat, and although not shown in FIG. 1, cooling for the diodes preferably is provided. Outputs of the N eVOAs 130, 132, . . . , and 134 are connected respectively to second inputs of the N combiners 140, 142, . . . , and 144. Outputs of the N combiners 140, 142, . . . , and 144 are connected to inputs of N isolators 150, 152, . . . , and 154 respectively. Outputs of isolators 150, 152, . . . , 154 are connected to N nonlinear optical limiters 160, 162, . . . , 164 respectively. Outputs of the N nonlinear optical limiters 160, 162, . . . , and 164 are connected via optical waveguide portions 161, 163, . . . , and 165 to N inputs 171, 173, . . . , and 175 of a multiplexer (MUX) 170. An output 176 of the MUX 170, which also serves as an output of the optical open loop DGE 100, is connected to an output fiber span 20.

In some preferred embodiments, the DEMUX 110 and the MUX 170 could be, for example, respectively an AWG DEMUX, and an AWG MUX, although it is to be understood that the DEMUX 110 and the MUX 170 may be respectively any apparatus capable of optical multiplexing and optical demultiplexing.

In terms of functionality, the incoming N WDM channels traversing input fiber span 10 are demultiplexed into N individual channels by the DEMUX 110. It is to be understood that these channels have undergone standard EDFA type amplification at various points along the network before arriving at the DGE 100 and hence are in need of equalization. The DEMUX 110 demultiplexes the multichannel WDM signal into N individual channels by selectively filtering and routing the signals into N separate outputs, each of which outputs signals of a specific and distinct wavelength band. The DEMUX 110 in the preferred embodiment is designed to filter, route and output signals only of wavelength bands corresponding to the wavelengths of the N channels which make up the multichannel WDM signal. Individual channels having wavelengths centered around $\lambda_1$, $\lambda_2, \ldots,$ and $\lambda_N$ are output respectively through outputs 112, 114, ..., 116 along waveguide portions 113, 115, ..., and 117. Output of the solid state laser diodes 120, 122, ..., and 124 are attenuated by the eVOAs 130, 132, ..., and 134, the outputs of which act as pump or bias signals and have fixed wavelengths (e.g. 600 nm, 980 nm etc.) which are different from the wavelengths of the WDM signals. Signals from the outputs of the eVOAs are then combined with the individual channels travelling along waveguide portions 113, 115, ..., and 117 respectively at the combiners 140, 142, ..., and 144. These pump or bias signals are responsible for biasing the nonlinear optical limiters 160, 162, ..., 164. The functionality of the nonlinear optical limiters themselves is discussed in more detail below. For the purposes of this embodiment, the nonlinear optical limiters limit the power of signals transmitted through them to a certain critical power, and in the power region just below this limit, transmit signals at a power relatively linear with respect to the input power. Biasing the nonlinear optical limiters effectively lowers the threshold that the power of the input signals must reach before the limiters begin to limit the power of transmitted signals. By increasing the power of the bias signal thereby effectively lowering the threshold, the maximum power and hence the dynamic range of the transmitted signal is varied. Again, the functionality of the nonlinear optical limiters themselves is described in detail below. The combined signals emerging from the combiners 140, 142, ..., and 144 pass through the isolators 150, 152, ..., and 154 and then proceed to the nonlinear optical limiters 160, 162, ..., 164 where any signal energy in excess of the limit of the nonlinear optical limiters will either be reflected or absorbed depending on the type of limiters being used. In this embodiment, the isolators 150, 152, ..., and 154 are provided for nonlinear optical limiters which exhibit some reflection of the incident light, and act to allow light to travel in a direction from the combiners 140, 142, ..., and 144 toward the nonlinear optical limiters 160, 163, ..., 165 but not in the reverse direction. Isolators 150, 152, ..., and 154 are not provided in an embodiment in which the nonlinear optical limiters exhibit no reflection of the incident light, as is the case when absorptive nonlinear optical limiters are used. Each nonlinear optical limiter is customized for the wavelength of the demultiplexed channel passing therethrough, absorbing or reflecting an amount of light intensity exceeding the limit of the nonlinear optical limiter only in a range centered on that wavelength while permitting other wavelengths to pass through. The power of all channels can be equalized by setting each bias to compensate for the non-uniformity of the spectral power of the demultiplexed signals. By controlling the eVOAs the bias point is set and the dynamic range of the equalized power is also set. In a preferred embodiment, the eVOAs are controlled by the same source. This eliminates the need for complex control loops. For further accuracy, control of the eVOAs may have been calibrated relative to each other to achieve uniformity to take into account for example variations in the nonlinear optical limiters, and manufacturing variation of each pump laser diode. A more detailed discussion about biasing and transmitted power follows below. The equalized signals along with the bias or pump signals emerge from the nonlinear optical limiters 160, 162, ..., and 164 traverse waveguide portions 161, 163, ..., and 165 to inputs 171, 173, ..., and 175 of the MUX 170. The MUX 170 multiplexes multiple channels by selectively filtering and routing separate signal inputs, each of which are of a specific and distinct wavelength band, into a single multichannel output made up of many wavelength bands. The MUX 170 in the preferred embodiment is designed to filter, route and multiplex signals only of wavelength bands corresponding to the wavelengths of the N channels which make up the multichannel WDM signal, namely channels of wavelengths centered around $\lambda_1, \lambda_2, \ldots,$ and $\lambda_N$. Signals of any other wavelength band are filtered out and are not multiplexed into the output signal. Individual channels having wavelengths centered around $\lambda_1, \lambda_2, \ldots,$ and $\lambda_N$ are input respectively through inputs 171, 173, ..., and 175 of the MUX 170. The bias pump power is filtered out by the MUX 170 since it resides on a different wavelength from the information carrying channels centered around $\lambda_1, \lambda_2, \ldots,$ and $\lambda_N$. The equalized channels are multiplexed by the MUX 170 into an N channel WDM signal and output from 176 onto outgoing fiber 20. It should be noted that combiners 140, 142, ..., and 144, could be directional couplers, X/Y combiners, or any other type of combiner capable of combining the channel signal with the laser diode bias signal.

Figure 2:
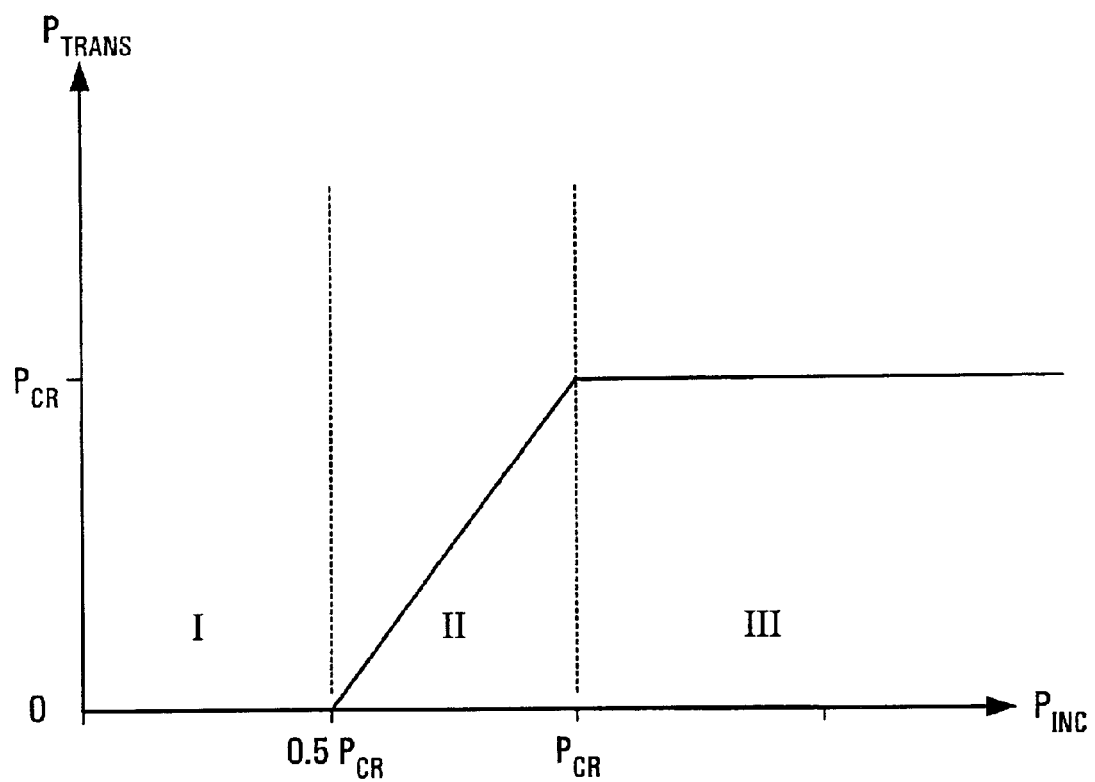
FIG. 2 is a graph of an example power transfer function of a preferred nonlinear optical limiter.

Referring to FIG. 2, the preferred power transfer function of nonlinear optical limiters for use in the preferred embodiment of the invention is described. In FIG. 2, a power transfer function between incident power and transmitted power is depicted, having a horizontal axis which represents the power of optical signals incident upon a nonlinear optical limiter ($P_{INC}$) and a vertical axis which represents the power of the optical signals transmitted through the optical limiter ($P_{TRANS}$). Generally, the nonlinear optical limiters used by the invention are typified by having a power transfer function between incident and transmitted light which has an upper limit of transmitted power $P_{TRANS}$ for a useful range of incident power $P_{INC}$ beyond some particular critical incident power $P_{CR}$ (this condition is satisfied when the function is relatively or asymptotically flat). It should be noted that an optical component having this functional behavior is nonlinear in that its transfer function is nonlinear, and is an optical limiter in that it imposes a limit to transmitted power. Optical elements exhibiting this functional dependency are typified by a change in their optical properties as a function of light intensity. Often the geometry of the optical element also has a part to play. For the purposes of the preferred embodiment described in association with FIG. 1, it is assumed that the nonlinear optical limiter will only reflect or absorb wavelengths within a specific characteristic wavelength band, and at the same time it is assumed that its optical properties may change due to incident light of wavelengths outside of that characteristic wavelength band. This behavior is described below in association with FIG. 3. Just below the critical incident power $P_{CR}$, the power transfer function preferably exhibits a monotonic increasing function. As shown in FIG. 2, transmitted power is preferably constant and zero for a range between zero incident power and some threshold incident power ($0.5P_{CR}$) (shown as region I). Below this threshold incident power, substantially none of the light or a negligible amount of it is transmitted. Once the incident power exceeds the power threshold, some of the incident light is transmitted. Transmitted power is preferably a linear function (although other smooth increasing functions would suffice) for the range between the threshold incident power ($0.5P_{CR}$) up to the critical incident power $P_{CR}$ (shown as region II) and is an upper limiting constant power for a range beyond the critical incident power $P_{CR}$ (shown as region III). In the preferred transfer function the upper limiting constant power is $P_{CR}$ as shown. It may in general be some limiting power $P_{LIMIT}$ which may not be related to $P_{CR}$. In all regions (I, II, and III) all of the incident power that is not transmitted is either reflected or absorbed or both. It should be noted that as long as the nonlinear optical limiter limits the transmitted power for a certain useful range of incident power beyond $P_{CR}$, it does not matter if at an incident power in excess of the useful range of incident powers the nonlinear optical limiter behaves differently from that depicted in FIG. 2. In other words, region III is not to be understood as of necessity extending to an arbitrarily large incident power. Optical limiters useful for the purpose of the invention have region III extend far enough to cover the range of powers it is designed to be used with. It also should be noted that although the preferred transfer function has a certain functional form, in general the shape of the curve in region I and II need not be exactly as shown, and may indeed be chosen for pulse shaping purposes. Specific nonlinear optical limiters are described below, although it should be noted that any passive optical element or elements exhibiting the kinds of power transfer functions discussed above are contemplated by the invention. From the graph of the preferred transfer function, it can be seen that in the absence of pumping or biasing (which will be explained shortly), incident light of a power less than 0.5 $P_{CR}$ will be completely reflected or absorbed (or both). Light having an intensity between 0.5 $P_{CR}$ and $P_{CR}$ will be transmitted as a function of its incident intensity, until at the point $P_{CR}$ all of the incident light is transmitted. For incident light with a power greater than $P_{CR}$, the proportion reflected or absorbed equals an amount in excess of the limit power ($P_{CR}$) leading to a transmitted power equal to the limit ($P_{CR}$).

It should be noted that for any optical limiter having a limiting power $P_{LIMIT}$ in region III, pulse reshaping is provided by effectively "cutting off" an input pulse peak whose power exceeds $P_{LIMIT}$ down to the power limit $P_{LIMIT}$, when transmitted. It should also be noted that in the preferred embodiment, the transfer curve exhibits a steeper region of positive slope greater than one in region II, and preferably the steeper region is located in the portion of the curve close to $P_{INC}=P_{CR}$. This has the added benefit of providing pulse reshaping by correcting the sides of a pulse by stretching. The zero or negligible region for incident power less than the threshold incident power, can serve as a "zero noise" rejection region. Signals or pulses with powers less than the threshold are substantially not transmitted.

Figure 3A:
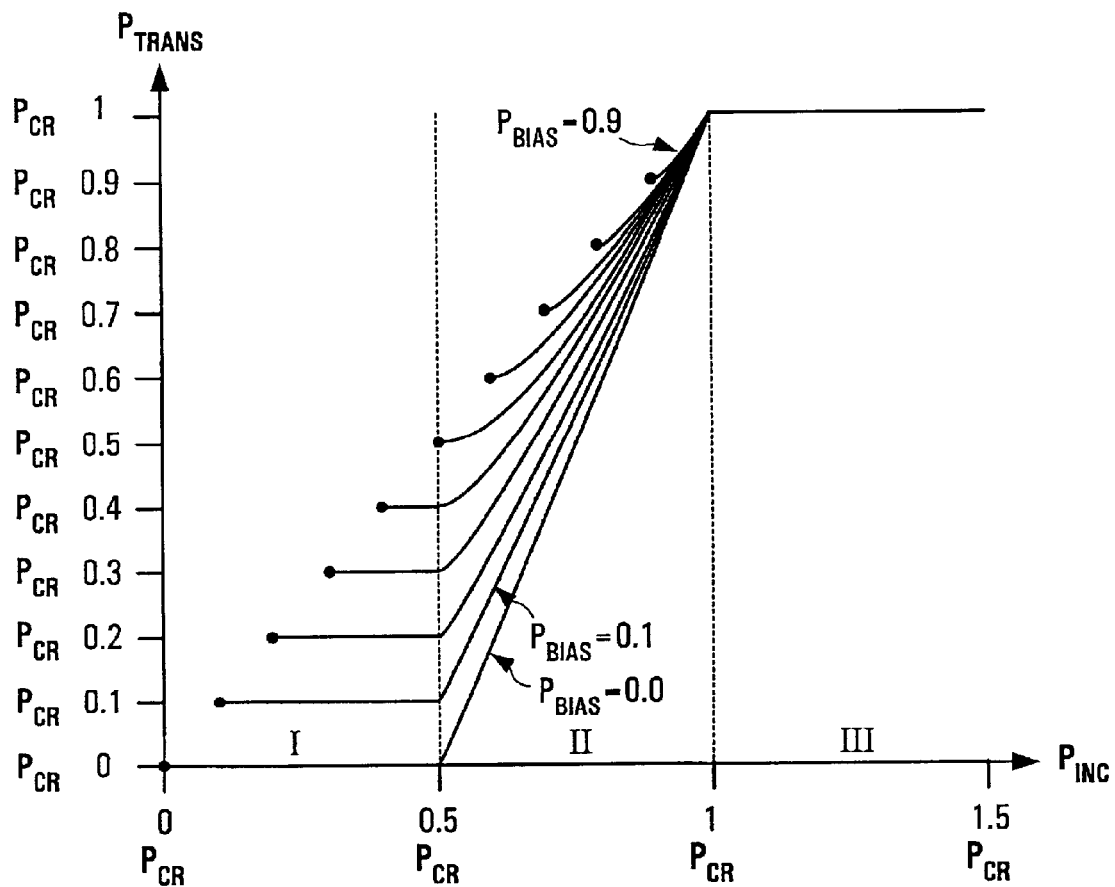
FIG. 3A is a graph of an example series of power transfer functions of a preferred nonlinear optical limiter in various biased states.
Figure 3B:
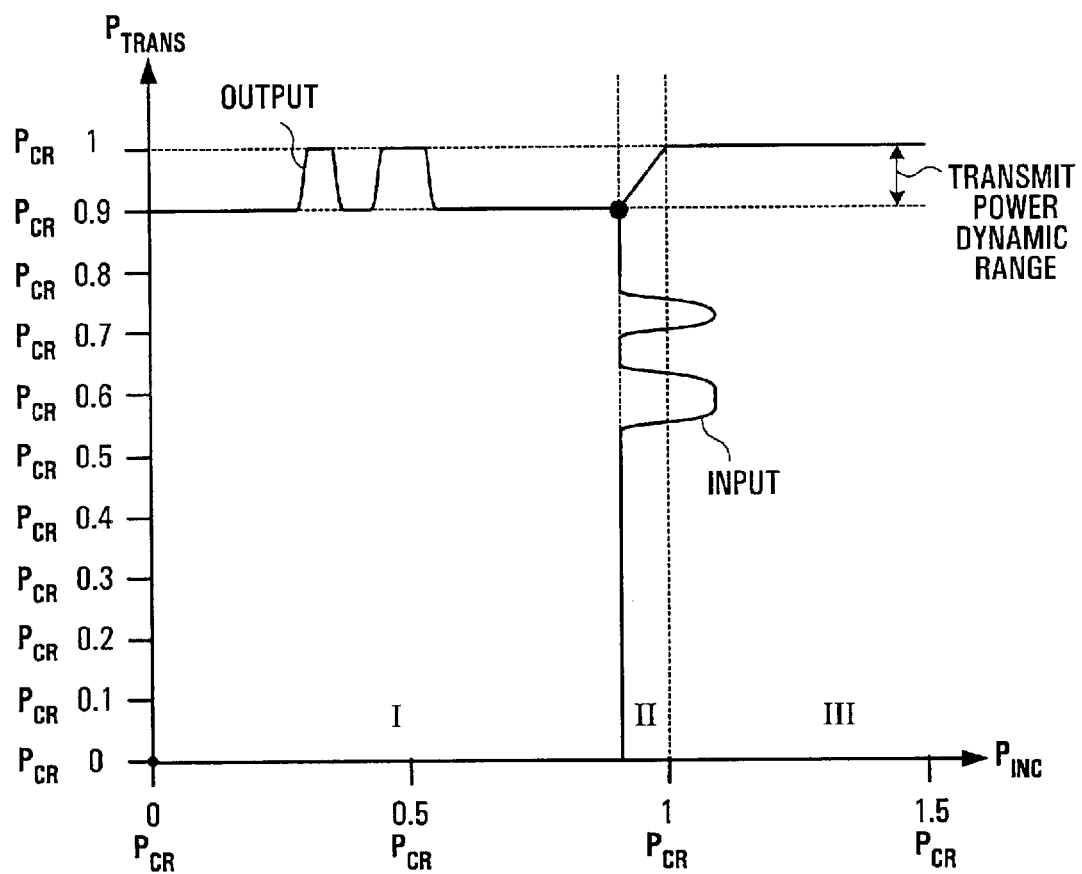
FIG. 3B is a graph of an example power transfer function of a preferred nonlinear optical limiter in a biased state of 0.9 $P_{CR}$.

With reference to FIGS. 3A and 3b, the relationship between input signals and signals transmitted through an example nonlinear optical limiter in a biased state is described. In the case where a nonlinear optical limiter exhibits reflection and/or absorption only in respect of a characteristic wavelength band (as described above), it may be that the nonlinear optical limiter may be "biased", i.e. its optical properties changed by incident light of wavelengths outside of its characteristic wavelength band. In the embodiment described in association with FIG. 1, the nonlinear optical limiters are assumed to be capable of being biased. As discussed, the nonlinear optical limiters are adapted to reflect and/or absorb wavelengths corresponding to the wavelength of the channel passing through it, while the light originating at the semiconductor laser diode lies outside of that wavelength range and is used only to bias the nonlinear optical limiter. FIG. 3A shows a graph of an example series of transmit power transfer functions of an examplenonlinear optical limiter for various levels of biasing. The horizontal axis represents the total power of optical signals incident upon the nonlinear optical limiter ($P_{INC}$), and the vertical axis represents the total power of the optical signals transmitted through the nonlinear optical limiter ($P_{TRANS}$). The total power is the sum of the biasing signal and the optical signals of the wavelength of interest. A total of ten power transfer curves have been plotted, corresponding to power transfer curves in the presence of bias powers of 0.0, 0.1, . . . , and 0.9 $P_{CR}$ respectively. Since the wavelength of the bias signal lies outside of the characteristic wavelength band of the nonlinear optical limiter, all of the power of the bias signal are unaffected and hence transmitted. This is indicated by the start of each curve (indicated by dots), lying upon the line $P_{TRANS}=P_{INC}$.

It can be seen that for $P_{BIAS}<0.5$ $P_{CR}$, part of the power transfer curve lies within region I. As noted above, in region I, substantially all of the incident power of the characteristic wavelength is not transmitted, leading to a relatively flat region for incident powers less than the power threshold. It should be noted that the incident power needed to reach this power threshold in region I, is 0.5 $P_{CR}-P_{BIAS}$.

In region II power transfer curves exhibit a monotonic increasing function which varies from the bias power to the critical power. As can be seen in FIG. 3A, the dynamic range (being the largest vertical variation on a given curve) of the transmitted signal having the characteristic wavelength, is the difference between the critical power and the bias power. It should be noted that for $P_{BIAS}>=0.5$ $P_{CR}$, no portion of the curve lies in region I, and no additional incident power is required to reach the power threshold. It also should be noted that at least some portion of each curve in region II has a slope of greater than one. Curves for lower bias powers on have larger average slopes than curves for higher bias powers. All curves have larger slopes nearer the critical power. This slope of greater than one, as noted above, serves to correct the sides of a pulse of the characteristic wavelength.

As with an unbiased nonlinear optical limiter, the relatively or asymptotically flat region III acts as a limit to transmitted power through a biased nonlinear optical limiter. As shown in FIG. 3A, in an exemplary nonlinear optical limiter, the power transfer curve in region III is completely flat.

Referring to FIG. 3B, an input signal of the channel incident upon the nonlinear optical limiter is superimposed on the power $P_{BIAS}$ of the biasing laser signal for a $P_{BIAS}$ of 0.9 $P_{CR}$. It is to be understood that the graph of the optical signals as shown are plots of the power envelopes or intensity of the light making up the optical signals, and not a representation of the instantaneous varying electric and magnetic fields associated with the photons which make up the light. A visual representation of the output signal is superimposed on the graph to show the relationship between the bias power point and the limit power of the nonlinear optical limiter. In the preferred embodiment, since the power of the bias signal is filtered out by the MUX 170, the height of the output signal superimposed on the graph is the power of the transmitted signal of the characteristic wavelength. The closer the bias signal is to the critical power $P_{CR}$, the less of the incident signal is transmitted as shown by the output signal superimposed on the graph. Effectively, the position of the bias point serves to set the upper limit of the power of the channel transmitted and hence sets the dynamic range of the transmitted power of the channel as indicated in the Figure. By varying each eVOA to control the bias power of the solid state laser diodes, the limiting power of each channel may be set. As discussed previously, in a preferred embodiment, the eVOAs are controlled by the same source which eliminates the need for complex control loops. The control of the eVOAs preferably has been calibrated at manufacture time to achieve uniformity, taking into account for example variations in the nonlinear optical limiters, and manufacturing variation of each pump laser diode. In the preferred embodiment the eVOAs may be recalibrated from time to time if the characteristics of the other components change over their operational lifetime. In an exemplary embodiment none of the components change in characteristics over their entire operational lifetime and no recalibration of the eVOAs is ever required. The maximum power transmitted is a function only of the difference between the bias signal power and the limit of the nonlinear optical limiter, and is independent of the relative power of the optical signals. In this manner, as long as channel power is large enough to cause cutoff, channel power drift does not require any readjustment. It should be noted that due to the upper limit imposed by the limiter, the pulse shape itself may change. In FIG. 3, a curved input pulse emerges as an output pulse having essentially the same shape, stretched, with the upper portions "chopped", creating something more like a set of square pulses.

Figure 3C:
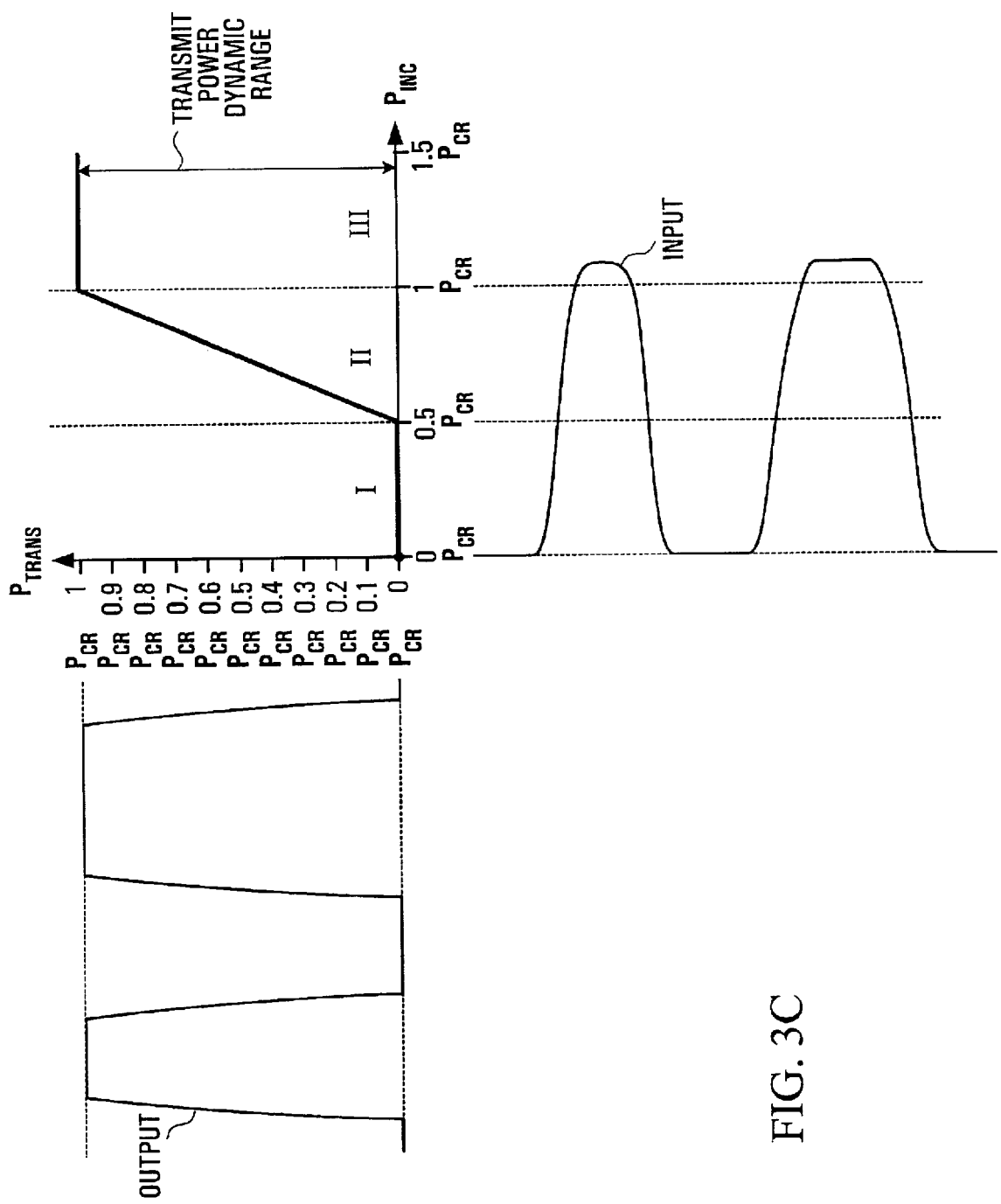
FIG. 3C is a graph of an example power transfer function of a preferred nonlinear optical limiter in a biased state of 0.1 $P_{CR}$.

FIG. 3C is an analogous graph to FIG. 3B, superimposing input and output signals on a power transfer curve which here is in the case of no biasing. This is the same curve as depicted in FIG. 2. As shown in FIG. 3C, the curve below the power threshold is essentially zero, the slope of the curve in region II is greater than one, and the dynamic range of transmitted signals is $P_{CR}$, The form of the curve in all three of these regions lead to the desired result of a power limited reshaped set of pulses as shown in the superimposed output.

Figure 4:
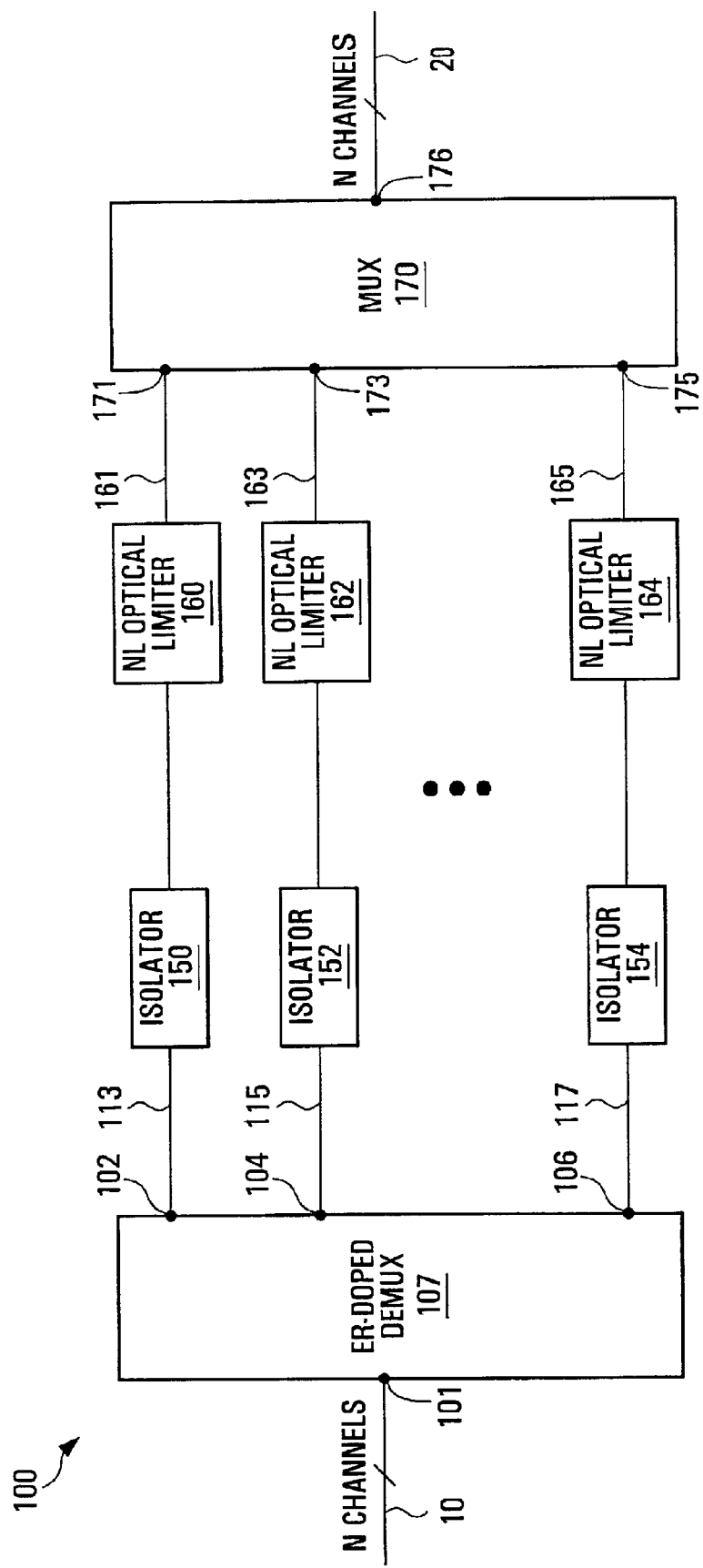
FIG. 4 is a block diagram of a first unbiased optical gain equalizer provided by an embodiment of the invention.

Referring to FIG. 4, a first unbiased optical open loop dynamic gain equalizer (DGE) generally indicated by 100 constructed according to an embodiment of the invention is described. Numbering of elements in FIG. 4 correspond to numbering of like elements of FIG. 1. This first unbiased embodiment is implemented with less discrete components than was described in association with FIG. 1. Input fiber span 10 carrying N multiplexed WDM channels is connected to input 101 of an Erbium doped demultiplexer (DEMUX) 107. The input 101 also serves as an input of the optical open loop DGE 100. The Erbium doped DEMUX 107 amplifies the WDM channels passing therethrough and has N outputs 102, 104, . . . , and 106 connected respectively to N waveguide portions 113, 115, . . . , and 117 which are respectively connected to inputs of N isolators 150, 152, . . . , and 154. Outputs of isolators 150, 152, . . . , and 154 are connected to N nonlinear optical limiters 160, 162, . . . , 164 respectively. Outputs of the N nonlinear optical limiters 160, 162, . . . , and 164 are connected to N inputs 171, 173, . . . , and 175 of a multiplexer (MUX) 170. An output 176 of the MUX 170, which also serves as an output of the optical open loop DGE 100, is connected to an output fiber span 20.

In terms of functionality, the incoming N WDM channels traversing input fiber span 10 are demultiplexed into N individual channels, by the Erbium doped DEMUX 107. It is to be understood that these channels have undergone standard EDFA type amplification at various points along the network before arriving at the DGE 100 and hence are in need of equalization. The Erbium doped DEMUX 107 amplifies and demultiplexes the multichannel WDM signal into N individual channels by applying amplification and selectively filtering and routing the signals into N separate outputs, each of which outputs signals of a specific and distinct wavelength band. The Erbium doped DEMUX 107 in the preferred embodiment is designed to amplify, filter, route and output signals only of wavelength bands corresponding to the wavelengths of the N channels which make up the multichannel WDM signal. Each of the individual channels passing therethrough is amplified so that the power of each channel is greater that the critical power for each of the nonlinear optical limiters. Individual channels having wavelengths centered around $\lambda_1, \lambda_2, \ldots,$ and $\lambda_N$ are output respectively through outputs 102, 104, . . . , 106 along waveguide portions 113, 115, . . . , and 117. The signals pass through the isolators 150, 152, . . . , and 154 and then proceed to the nonlinear optical limiters 160, 162, . . . , 164 where any pulse energy in excess of the limit of the nonlinear optical limiters will either be reflected or absorbed depending on the type of limiters being used. In this embodiment, the isolators are provided for nonlinear optical limiters which exhibit some reflection of the incident light, and act to allow light to travel in a direction from the Erbium doped DEMUX 107 towards the nonlinear optical limiters but not in the reverse direction. Isolators 150, 152, . . . , and 154 are not generally implemented in an embodiment in which the nonlinear optical limiters exhibit no reflection of the incident light, as is the case when absorptive nonlinear optical limiters are used. As with the embodiment described in association with FIG. 1, the nonlinear optical limiters limit the power of signals transmitted through them to a certain critical power, and in the power region just below this limit, transmit signals at a power relatively linear with respect to the input power. Each nonlinear optical limiter is customized for the wavelength of the demultiplexed channel passing therethrough, absorbing or reflecting an amount of light intensity exceeding the limit of the nonlinear optical limiter only in a range centered on that wavelength. Here the nonlinear property of the nonlinear optical limiters depend upon the power of the signals themselves as controlled by the Erbium doped DEMUX 107, and not upon any bias power. As there is no bias power involved, the dynamic range can be fixed by the design of the nonlinear optical limiters, specific examples of which are discussed below. The power of all channels is equalized by adapting the nonlinear optical limiters to have the same optical limiting power. The amplification of all the signals beyond the critical power renders uneven amplification immaterial and ensures uniformity of the spectral power of the demultiplexed signals emerging from the nonlinear optical limiters. This embodiment, relying only on the passive behavior of the nonlinear optical limiters dispenses with the need for complex control loops. Uniformity will only be limited by variations in the nonlinear optical limiters. The equalized signals emerge from the nonlinear optical limiters 160, 162, . . . , and 164 and traverse waveguide portions 161, 163, . . . , and 165 to inputs 171, 173, . . . , and 175 of the MUX 170. The equalized channels are multiplexed by the MUX 170 which functions the same as the MUX 170 described in association with FIG. 1 except in this embodiment there are no bias signals which need to be filtered out. The equalized multiplexed channels are output from 176 onto outgoing fiber 20.

Figure 5:
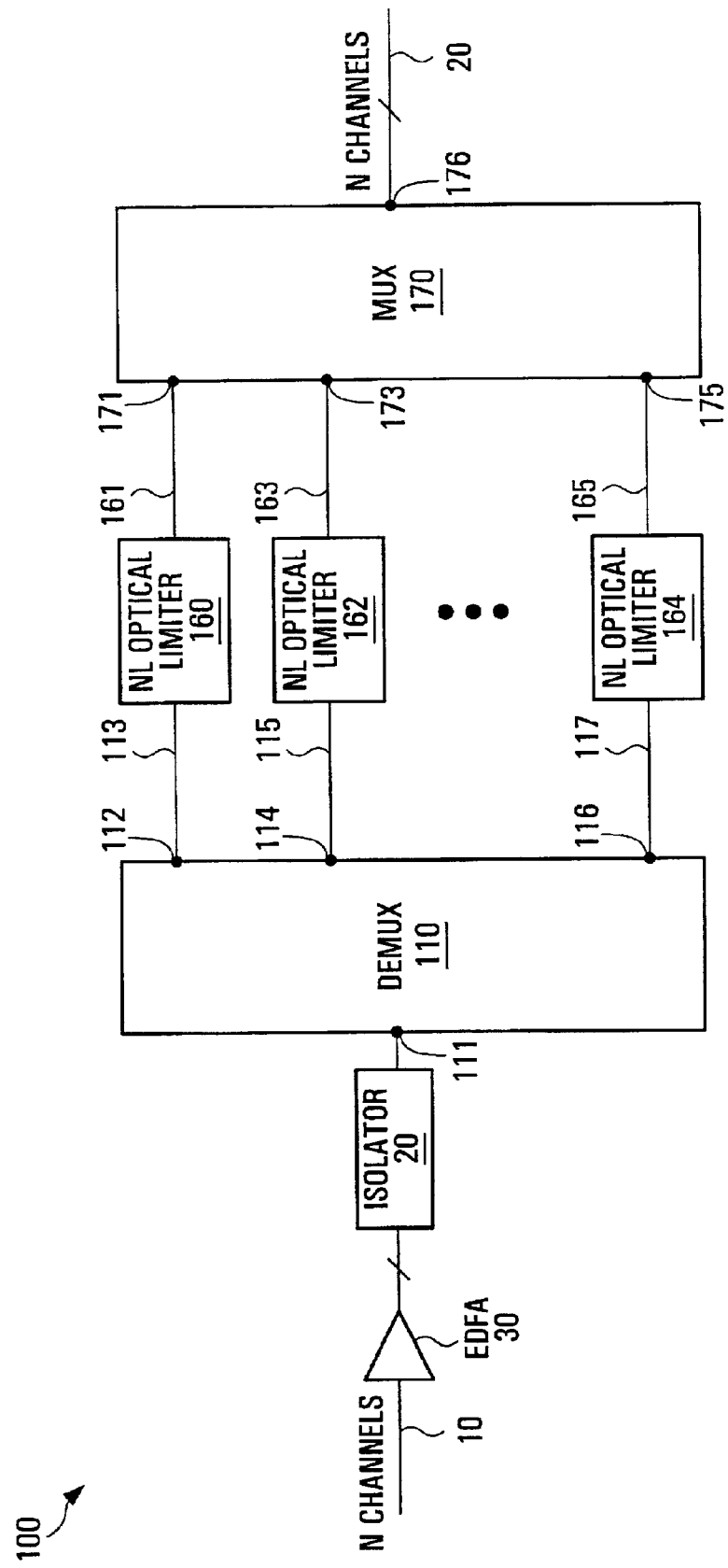
FIG. 5 is a block diagram of a second unbiased optical gain equalizer provided by an embodiment of the invention.

Referring to FIG. 5, a second unbiased optical open loop dynamic gain equalizer (DGE) generally indicated by 100 constructed according to an embodiment of the invention is described. This second unbiased embodiment depicted in FIG. 5 is a variation of the first unbiased embodiment depicted in FIG. 4. Instead of an using an Erbium doped DEMUX 107 to amplify each of the individual channels passing therethrough so that the power of each channel is greater that the critical power for each of the nonlinear optical limiters, this embodiment relies on an external EDFA 30 to simultaneously amplify the N WDM channels beyond the critical power of the nonlinear optical limiters. Instead of providing an isolator in front of each nonlinear optical limiter, a single external isolator 20 is employed. The embodiment depicted in FIG. 5 operates to amplify the WDM channels before they arrive at the isolator 20, and before they are demultiplexed. In this embodiment, the external isolator 20 is provided for nonlinear optical limiters which exhibit some reflection of the incident light, and acts to allow light to travel in a direction from the EDFA 30 to the DEMUX 110, but not in the reverse direction. In some embodiments, the external isolator 20 is built into the external EDFA 30. The isolator 20 is not generally implemented in an embodiment in which the nonlinear optical limiters exhibit no reflection of the incident light, as is the case when absorptive nonlinear optical limiters are used. In all other respects, the second unbiased embodiment of FIG. 5 operates analogously to the unbiased embodiment depicted in FIG. 4. The amplified WDM channels emerging from the isolator 20 is demultiplexed into individual channels, by the DEMUX 110. The individual channels are output through outputs 112, 114, . . . , 116 along waveguide portions 113, 115, . . . , and 117. The signals proceed to the nonlinear optical limiters 160, 162, . . . , 164 where any pulse energy in excess of the limit of the nonlinear optical limiters will either be reflected or absorbed depending on the type of limiters being used. As with the embodiment described in association with FIG. 1, the nonlinear optical limiters limit the power of signals transmitted through them to a certain critical power, and in the power region just below this limit, transmit signals at a power relatively linear with respect to the input power. Each nonlinear optical limiter is customized for the wavelength of the demultiplexed channel passing therethrough, absorbing or reflecting an amount of light intensity exceeding the limit of the nonlinear optical limiter only in a range centered on that wavelength. Here the nonlinear property of the nonlinear optical limiters depend upon the power of the signals themselves as controlled by the external EDFA 30, and not upon any bias power. As there is no bias power involved, the dynamic range can be fixed by the design of the nonlinear optical limiters. The power of all channels is equalized by ensuring that the nonlinear optical limiters have the same optical limiting power. The amplification of all the signals beyond the critical power renders uneven amplification immaterial and ensures uniformity of the spectral power of the demultiplexed signals emerging from the nonlinear optical limiters. This embodiment, relying only on the passive behavior of the nonlinear optical limiters dispenses with the need for complex control loops. Uniformity will only be limited by variations in the nonlinear optical limiters. The equalized signals emerge from the nonlinear optical limiters 160, 162, . . . , and 164 and traverse waveguide portions 161, 163, . . . , and 165 to inputs 171, 173, . . . , and 175 of the MUX 170. The equalized channels are multiplexed by the MUX 170 and output from 176 onto outgoing fiber 20. For the configuration indicated in FIG. 5, it is preferable that all such components be grown on the same substrate to avoid any additional alignment procedures which might be required if all components were not grown on the same substrate. In general this preference is true of any configuration which can be grown on the same substrate.

Figure 6:
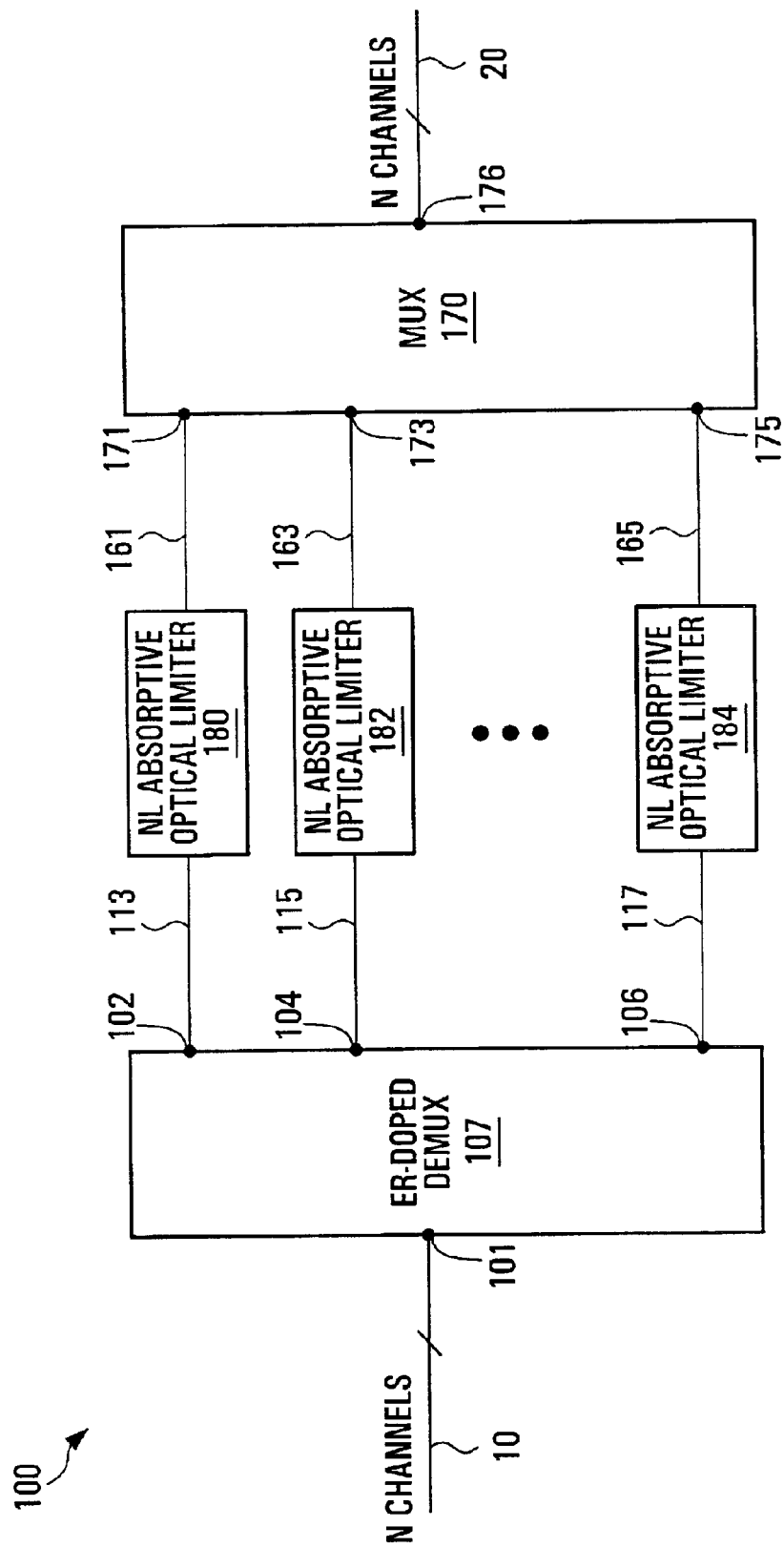
FIG. 6 is a block diagram of a third unbiased optical gain equalizer provided by an embodiment of the invention.

In all embodiments where an isolator and a nonlinear optical limiter with reflective properties are adjacent as in FIGS. 1 and 5, the pair can be replaced with a nonlinear absorptive optical limiter as shown in FIG. 6. FIG. 6 is an example of such a substitution applied to the embodiment described with respect to FIG. 4. This replacement is equivalent to isolators not being required when the nonlinear optical limiters are absorptive.

Figure 7:
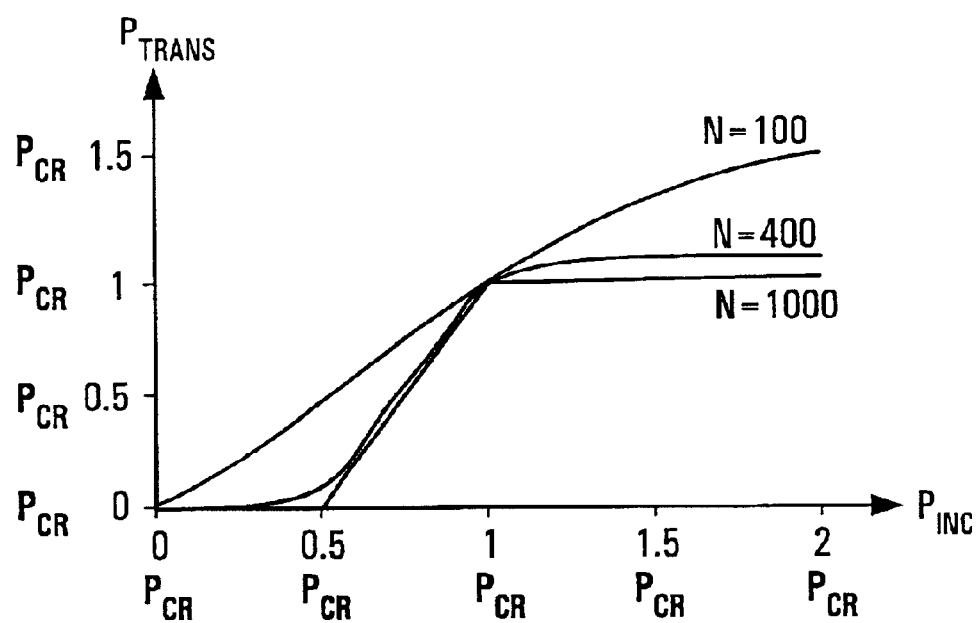
FIG. 7 is a graph of an example power transfer function of a nonlinear Bragg Grating acting as a nonlinear optical limiter.

Referring to FIG. 7, a specific implementation of a nonlinear optical limiter for use in association with the invention is described. FIG. 7 depicts a typical series of power transfer functions for various numbers of layers in a nonlinear optical limiter based on Bragg gratings technology employing nonlinear Kerr materials. The critical power $P_{CR}$ has been normalized to 1, and the number of layers of the nonlinear Bragg Grating is indicated by N for each plot.

As described above, in the preferred embodiments the nonlinear optical limiter used may reflect or absorb signal power which is not transmitted, or both. Both reflective and absorptive nonlinear limiters constructed according to current material technology rely on high optical power signals to excite their nonlinear properties to limit or saturate the output power level. Such power limiting characteristics leads to self-adaptive dynamic gain equalization without requiring any external control. Although the following discussion describes a nonlinear optical limiter constructed from a nonlinear Bragg Grating comprising known nonlinear Kerr materials exhibiting reflection, the invention contemplates any passive optical element which behaves as a nonlinear optical limiter.

The nonlinear Bragg Grating is constructed from alternating Kerr materials, and has a geometry adapted in accordance with standard Bragg Grating construction, to reflect light of a certain wavelength for which the Bragg Grating is designed. In the case of a Bragg Grating constructed with Kerr materials, as the intensity of the light increases, the optical properties of the layers themselves change. The "Kerr effect" is represented by the following equation which shows that the local intensity of incident light in the medium determines the local index of refraction:

$$n = n_0 + n_{n1} I$$

where I is the local intensity of light in the medium, n is the local index of refraction, $n_0$ is the linear part the index of refraction and $n_{n1}$ is the Kerr coefficient of the index of refraction. For a detailed explanation of the Kerr effect see P. Yeh, "Optical Waves in Layered Media", (Wiley Series in Pure and Applied optics), and L. Brzozowski, E. H. Sargent, "All-Optical Analog-to-Digital Converters, Hardlimiters, and Logic Gates", JLT, January 2001. It is assumed for the purposes of the embodiments using a biasing signal, that the index of refraction of the Kerr materials chosen have a frequency sensitivity which is relatively flat over a given useful range of frequencies. In other words the change in index of refraction is relatively the same for intensities of light independent of frequency within a large operational range of frequencies which, for the preferred embodiment, covers both the bias signal wavelength and the channel wavelength.

In constructing a Bragg grating using alternating Kerr materials, the standard Bragg condition should be met:

$$(n_{01} + n_{n1l}I)d_1 + (n_{02} + n_{n12}I)d_2 = \frac{\lambda}{2}$$

where $n_{01}$, and $n_{n11}$ are respectively the linear part and Kerr coefficient of the first Kerr material, and $n_{02}$, and $n_{n12}$ are respectively the linear part and Kerr coefficient of the second Kerr material. The wavelength of the light which is reflected by the Bragg grating is $\lambda$, $d_1$ is the thickness of the layers of the first Kerr material, and $d_2$ is the thickness of the layers of the second Kerr material.

For a fixed center frequency the following should be satisfied:

$$n_{01}d_1 + n_{02}d_2 = \frac{\lambda}{2}$$

It should be noted that these conditions can only be satisfied if the Kerr coefficients $n_{n11}$ and $n_{n12}$ are of opposite signs.

These equations lead to the relevant gratings parameters $d_1$, and $d_2$ which are as follows:

$$d_1 = \frac{\lambda}{2\left(n_{01} - n_{02}\frac{n_{nl1}}{n_{nl2}}\right)}$$

$$d_2 = \frac{\lambda}{2\left(n_{02} - n_{01}\frac{n_{nl2}}{n_{nl1}}\right)}$$

The transmitted output intensity $I_{out}$ will be dependent on the material chosen, and have the following piecewise functional form:

$$I_{out} = \begin{cases} 0 & \text{for } I_{in} < \frac{a}{2} \\ 2a(I_{in} - 1) & \text{for } \frac{a}{2} < I_{in} < a \\ a & \text{for } I_{in} > a \end{cases}$$

Where a is, $$a = \frac{n_{01} - n_{02}}{|n_{nl1}| + |n_{nl2}|}$$

Referring back to FIG. 7, the general behavior of a nonlinear Bragg Grating with respect to optical signals of a characteristic wavelength of the Bragg Grating is shown as a plot of transmitted intensity $P_{TRANS}$ versus incident intensity $P_{INC}$ of light of that particular wavelength. It can be seen that for various numbers of layers N, at low incident power the grating reflects most or all of the incident light. As the power of the incident light increases, the Kerr effect incurs a positive and a negative change in the refractive indices of the gratings in alternating layers. This reduces the effective strength of the grating so that some portion of the light passes through the grating and some is reflected. As the power of the incident light increases to reach a critical value (which here is normalized to 1), the indices of refraction of the alternating layers become equal. At this point the effective strength of the grating becomes zero and all incident power passes through. If the incident power is increased beyond the critical point, the alternating layers take on different refractive indices in a sense opposite to that before the critical level of incident light was reached. As a result once again a proportion of the light is reflected. Coincidentally, in the limiting case of large N (number of layers) the increase in proportion of reflected light matches exactly with the increase of intensity of the incident light resulting in a constant transmission power as the incident light increases in power. This effectively serves as placing a maximum limit to the power transmitted through the device, and hence the nonlinear Bragg grating is an optical limiter. It should be noted that in the case that nonlinear Bragg gratings are used as the nonlinear optical limiters of the preferred embodiments, N is preferably between 400 and 1000.

In order to excite the Kerr effect in known materials, the power of the incident light must be high. Although in general it must only be ensured that the optical power of the incident light be greater than the critical power, in optical networking applications using current commonly known materials it is essential to boost up the incident power level by either amplifying the signal itself using an amplifier, or using a biasing signal to pump the nonlinear-gratings as proposed in each of the embodiments.

In the case of a pumped or biased nonlinear Bragg Grating of the preferred embodiment, the power transfer function for the power of transmitted light of the WDM channel passing therethrough is slightly different since both the biasing signal and the transmitted WDM channel contribute to the Kerr effect (assuming a relatively flat frequency sensitivity), but due to the geometry of the nonlinear Bragg Grating, only light of a certain wavelength is reflected or absorbed. As a result, the power of the transmitted light having the wavelength of interest $\lambda$, namely $P_{\lambda TRANS}$, as a function of the power of the biasing signal $P_{BIAS}$, and the power of the incident light of wavelength $\lambda$, namely $P_\lambda$ is:

$$P_{\lambda TRANS} = \begin{cases} 0 & \text{for } P_{BIAS} + P_\lambda < 0.5 \\ 2P_\lambda + \frac{P_\lambda}{P_{BIAS} + P_\lambda} & \text{for } 0.5 < P_{BIAS} + P_\lambda < 1 \\ \frac{P_\lambda}{P_{BIAS} + P_\lambda} & \text{for } P_{BIAS} + P_\lambda > 1 \end{cases}$$

In this expression the incident power has been normalized i.e. $P_{CR}=1$. It is important to note this is an empirical formula which may be approximately true in some cases. The actual behavior of a given limiter under biasing needs to be measured.

Figure 8:
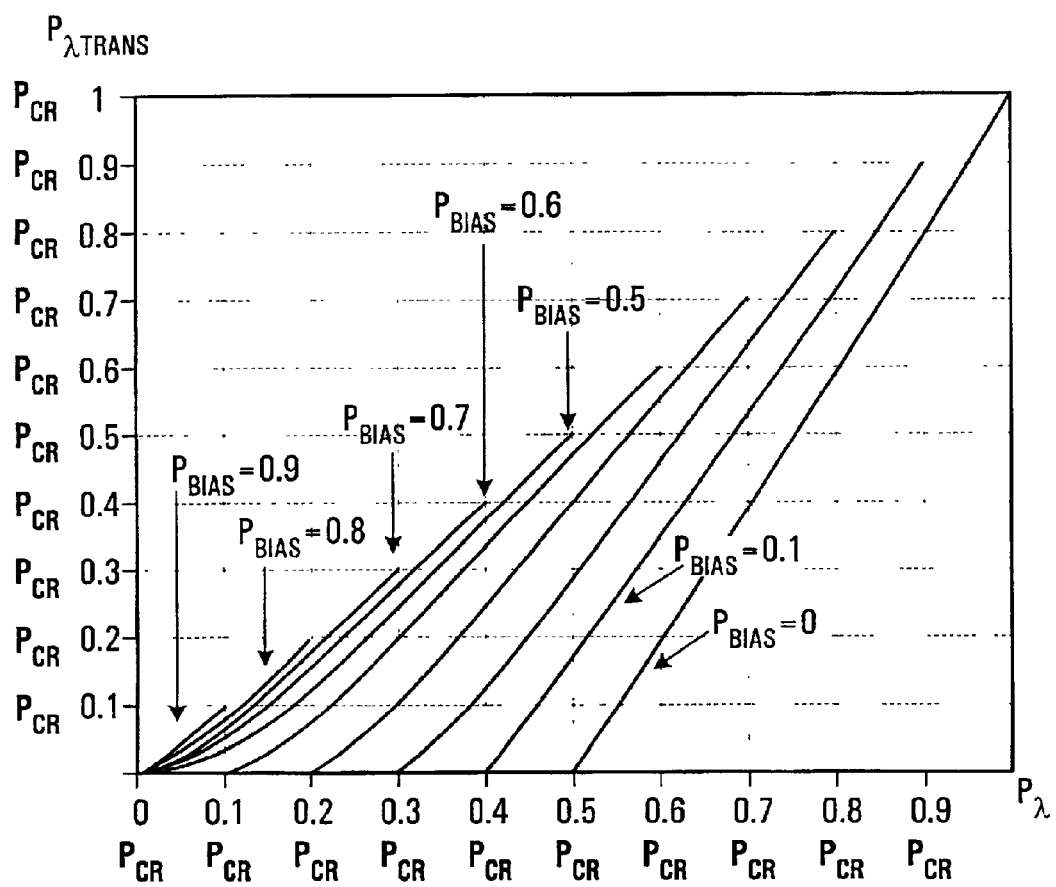
FIG. 8 is a graph of an example series of power transfer functions of a nonlinear Bragg Grating biased at different levels.

Referring to FIG. 8, a family of power transfer curves for various values of $P_{BIAS}$ is discussed. As can be seen, in the case of a biased grating not all power transfer curves are linear. All are however monotonic and increasing and are relatively linear, especially in the regions of $P_{BIAS}$ close to 1.0 or 0.0. In the preferred embodiment as depicted in FIG. 1, $P_{BIAS}$ is set close to but not too close to 1.0, where the transfer curves are essentially linear and have a slope of about one. This will translate into transmitted pulses which are basically the same shape as the incident pulses up to the cutoff. As can be readily seen in FIG. 8, as $P_{BIAS}$ is reduced the average slope of the transfer curve increases until it reaches a slope of 2.0 when $P_{BIAS}=0$. It also can be seen that that for each curve there is a steeper region just below the critical power, where each transfer function is at its steepest and has a slope somewhere between 1.0 and 2.0. Although in the preferred embodiment the bias power is chosen close to 1.0, choosing a bias power closer to 0.5 can take advantage of the steeper region having a slope of greater than one for pulse reshaping. In the case of an optical signal having a square pulse which has undergone dispersion and has degenerated into a more rounded, Gaussian-like pulse, the positive slope of the power transfer curve can help serve to "tighten up" the pulse. A slope of greater than one in the steeper region of the transfer curve causes stretching which leads to correction of the sides of the pulse, over and above that of the reshaping caused by cutoff.

Figure 9:
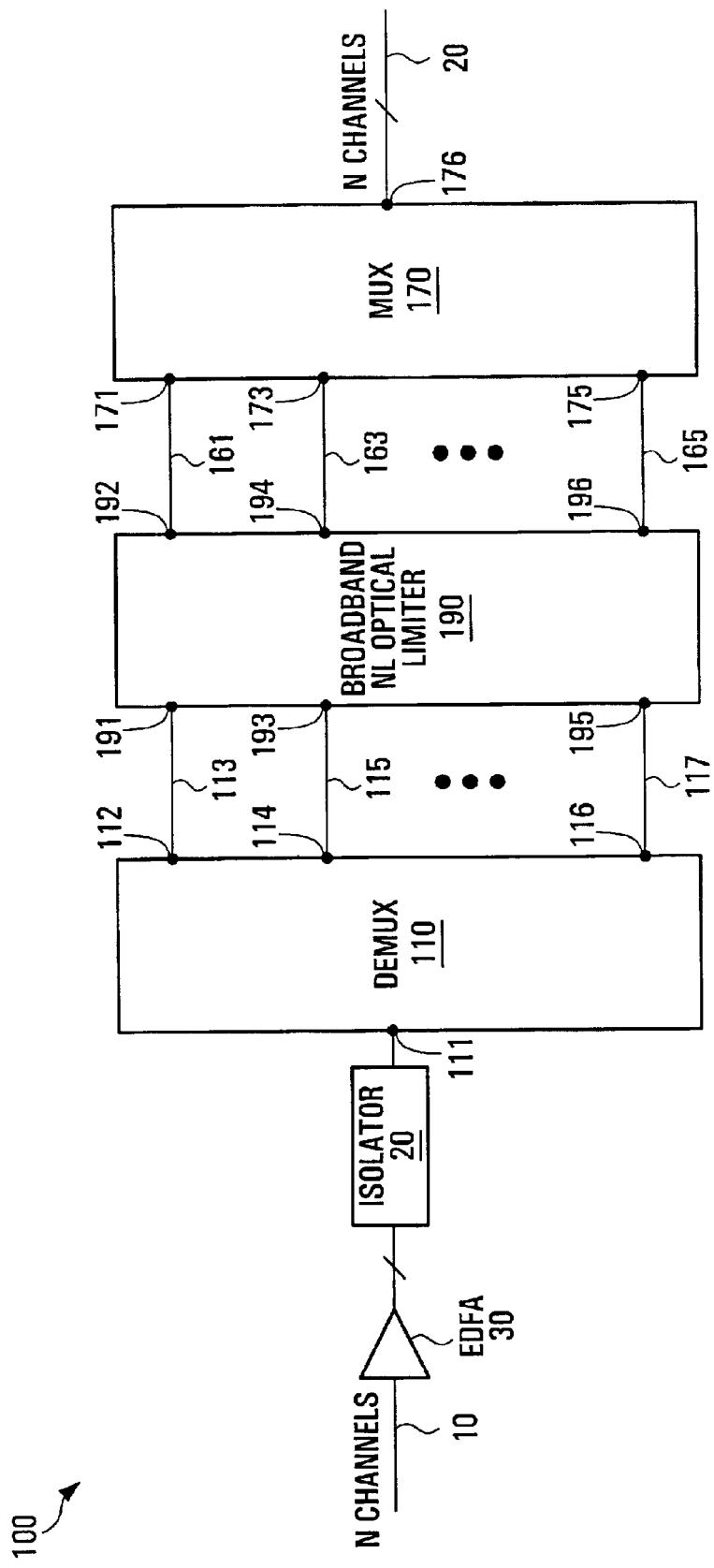
FIG. 9 is a block diagram of a broadband optical gain equalizer provided by an embodiment of invention.

Referring to FIG. 9, a broadband optical open loop dynamic gain equalizer (DGE) generally indicated by 100 constructed according to an embodiment of the invention is described. Some nonlinear optical limiters work for a wide range of wavelengths, reflecting or absorbing light of a wide range of wavelengths. In the case of nonlinear Bragg gratings, a broadband grating can be constructed by linearly chirping or randomizing the grating's period. Although for Bragg gratings, this technique currently only extends the bandwidth a few to 10 nm, the invention in general contemplates the use of any type of broadband nonlinear optical limiter having the desired power transfer curve. More detailed explanations of broadband limiters beyond the scope of this document may be found in L. Brzozowski, E. H. Sargent, "Nonlinear Disordered Media for Broad-band Optical Limiting", IEEE Journal of Quantum Electronics, Vol. 36, No. 11, November 2000; B. L. Justus, A. L. Huston, and A. J. Campillo, "Broadband thermal optical limiter", Applied Physics Letters, Vol. 63, No. 11, Sep. 13, 1993; and X. Sun, R. Q. Yu, G. Q. Xu, T. S. A. Hor, and W. Ji, "Broadband optical limiting with multiwalled carbon nanotubes", Applied Physics Letters, Vol. 73, No. 25. Dec. 21, 1998. FIG. 9 depicts an embodiment which uses a single broadband nonlinear optical limiter for all of the WDM channels. Instead of N nonlinear optical limiters as depicted in FIG. 5, inputs 191, 193, . . . , and 195 of a single broadband nonlinear optical limiter 190 are connected to waveguide portions 113, 115, . . . , and 117 which are connected to outputs 112, 114, . . . , and 116 respectively of the DEMUX 110. Outputs 192, 194, . . . , and 196 of the broadband nonlinear optical limiter 190 are connected to waveguide portions 161, 163, . . . , 165 which are connected to inputs 171, 173, . . . , and 175 respectively of the MUX 170. This embodiment functions very much the same was as the embodiment discussed in association with FIG. 5. The WDM channels emerging from the isolator 20 is demultiplexed into individual channels, by the DEMUX 110. The individual channels are output through outputs 112, 114, . . . , 116 along waveguide portions 113, 115, . . . , and 117. The signals proceed to inputs 191, 193, . . . , and 195 of the broadband nonlinear optical limiter 190 where any pulse energy in excess of the limit of the broadband nonlinear optical limiter 190 will either be reflected or absorbed depending on the type of limiter being used. As with the embodiment described in association with FIG. 1, the broadband nonlinear optical limiter 190 serves to limit the power of signals transmitted through it to a certain critical power, and in the power region just below this limit, transmit signals at a power relatively linear with respect to the input power. The broadband nonlinear optical limiter is constructed to provide a relatively frequency independent power transfer curve. In other words, the shape of the curve and the cutoff or limiting power should be the same for each of the demultiplexed channels passing therethrough. Here the nonlinear property of the broadband nonlinear optical limiter 190, depends upon the power of the signals themselves as controlled by an external EDFA 30, and not upon any bias power. As there is no bias power involved, the dynamic range can be fixed by the design of the broadband nonlinear optical limiter 190. The power of all channels is equalized by ensuring that the broadband nonlinear optical limiter 190 has the same optical limiting power for each channel. The amplification of all the signals beyond the critical power renders uneven amplification immaterial and ensures uniformity of the spectral power of the demultiplexed signals emerging from the broadband nonlinear optical limiter 190. This embodiment, relying only on the passive behavior of the broadband nonlinear optical limiter dispenses with the need for complex control loops. Uniformity will only be limited by variations in the frequency profile of the broadband nonlinear optical limiters. It should be noted that for a broadband implementation to work, spatial separation between regions in which different channels propagate is required to ensure there is no "cross-channel", or "inter-signal" biasing. If this were not ensured, light intensity from one channel could contribute a biasing intensity to the region of the nonlinear optical limiter reserved for a different channel. The interaction of an unwanted varying biasing signal with the nonlinear optical properties of the limiter in spatial regions where it clearly is not wanted would lead to erratic and unwanted behavior in the transmitted signals. The equalized signals emerge from outputs 192, 194, . . . , and 196 of the broadband nonlinear optical limiter 190 and traverse waveguide portions 161, 163, . . . , and 165 to inputs 171, 173, . . . , and 175 of the MUX 170. The equalized channels are multiplexed by the MUX 170 and output from 176 onto outgoing fiber 20. It should be noted that a series a less broad nonlinear optical limiters could be used in place of the single broadband nonlinear optical limiter. In this way instead of all channels passing through a single limiter, groups of channels within a smaller range of frequencies would be passed though smaller frequency range broadband limiters.

With respect to the use of nonlinear Bragg gratings as nonlinear optical limiters, some examples of nonlinear materials that can be used are disperse red 1 (DR1), polymethylmethacrylate (PMMA), poly(1,4 - henylenevinylene) (PPV), methyl orange (MO), and methyl red (MR). These and other nonlinear materials are more fully discussed in Roberts, M. J.; Stenger-Smith, J. D.; Zarras, P.; Lindsay, G. A.; Hollins, R. A.; Chafin, A. P.; Yee, R. Y.; Wynne, K. J., "Processing assisted self assembly of nonlinear optical polymers Broadband Optical Networks and Technologies: An Emerging Reality/Optical MEMS/Smart Pixels/Organic Optics and Optoelectronics", 1998 IEEE/LEOS Summer Topical Meetings, 1998 Page(s): III/3–III/4; R. Rangel-Rojo, S. Yamada, and J. Matsuda. "Large Near-resonance third-order nonlinearity in an azobenzene-functionalized polymer film" Applied Physics Letters, vol. 72, No. 9, Mar. 2, 1998; and C. R. Mendonca, M. M. Costa, J. A. Giacometti, F. D. runes, and S. C. Zilio, "Nonlinear refractive indices of polystyrene films doped with azobenzene dye Disperse Red 1", IEEE Electronics Letters, vol. 34, No. 1, 8th Jan., 1998.

With respect to the transmission of optical signals, excitable nonlinear absorbers function in a manner producing the same results as excitable nonlinear reflective Bragg Gratings. Whereas the nonlinear reflective Bragg Gratings function as optical limiters based on reflection of excess light, nonlinear absorbers function as optical limiters based on the absorption of excess light. In this way nonlinear absorptive limiters have the same characteristic limit to transmitted intensity, and a similar power transfer curve, the only difference being what happens to the non-transmitted light. More detailed discussions in this regard may be found in M. Cha, N. S. Sariciftci, A. J. Heeger, J. C. Hummelen, and F. Wudi, "Enhanced nonlinear absorption and optical limiting in semiconducting polymer/methanofullerene charge transfer films", Applied Physics Letter 67 (26) Dec. 25, 1995; T Xia, D. J. Hagan, A. Dogariu, A. A. Said, and E. W. Van Stryland, "Optimization of optical limiting devices based on excited-state absorption", Applied optics. Vol. 36, No. 18, Jun. 20, 1997; Y. Song, G. Fang, Y. Wang, S. Liu, and C. Li, "Excited-state absorption and optical-limiting properties of organometallic fullerene—C60 derivatives", Applied Physics Letters. Vol. 74, No. 3, Jan. 18, 1999; P. Miles, "Bottleneck optical pulse limiters revisited", Applied optics. vol. 38, No. 3, Jan. 20, 1999; and J. S. Shirk, R. G. S. Pong, F. J. Bartoli, and A. W. Snow, "Optical limiter using a lead phthalocyanine" Applied Physics Letters. Vol. 63, No. 14, Oct. 4, 1993.

It is to be understood that although the preferred embodiment discussed in association with FIG. 1 specifically refers to a solid state laser diode, paired with an eVOA, any continuous wave laser and power adjusting apparatus can serve as the bias signal source, and more generally any bias signal source appropriate for biasing the nonlinear optical limiters is contemplated. Also, although the embodiment has been described using a coupler to combine the bias signal with the optical channel to be equalized, the principle of the invention is to use the bias signal to bias the nonlinear optical limiter, and contemplates injecting this biasing signal from any direction into the nonlinear optical limiter.

Although for embodiments of the invention in Figures other than FIG. 9 it was assumed that the nonlinear optical limiters were designed for specific wavelengths, this is not a required for the operability of the respective embodiments. Alternatively broadband nonlinear optical limiters may be used in the embodiments described in association with FIGS. 1, 4, 5, and 6 as long as the spatial separation between regions in which different channels propagate, as discussed in association with the broadband embodiment, is present.

Of note are some of the benefits exhibited by these embodiments. The preferred embodiment is virtually all optical (except eVOA set point circuitry). All embodiments reshape incoming optical waveforms, and compared with existing solutions, provide better optical performance including higher spectral uniformity, and accuracy. Due to the open loop design, the response time is fast (on the order of 1 ps) and only limited by grating materials, and not control loop latency. Furthermore in an open loop design, the accuracy is dictated by grating fabrication, and not complex loop controlling electronics. Some embodiments may be integrated on a single substrate (PLC) ready for higher function integration and are more compact in size than standard solutions. In the preferred embodiment, the eVOAs only need to be set once since the maximum power transmitted is a function of the difference between the bias signal power and the limit of the nonlinear optical limiter. In the preferred embodiment, although cooling for the laser diodes is preferred, accurate temperature control is not required since the bias wavelength accuracy is not an issue.

Although the embodiments have been described as not having a closed loop design, it may be desirable in some cases to modify the embodiment to incorporate a closed loop design. A closed loop design further includes a spectrum analyzer measuring the output of the DGE or the individual signals after they have passed through the limiter or limiters, and an associated controller having feedback loops to control the eVOAs to control the bias power of the solid state lasers of the embodiment depicted in FIG. 1 to further equalize the powers of the individual signals. More generally any equalization analyzer which assesses the equalization of the signals and associated controller or controllers for controlling the bias power are sufficient for the closed loop design. It is to be understood that the equalization analyzer and the associated controller or controllers may be separate components or combined into a single component. Although a closed loop embodiment is more expensive and lossy, in a closed loop design with feedback calibration is not needed. The adaptive performance of the closed loop design could provide for stable performance across various temperature ranges and aging effects. Athermal packaging which may be used in an open loop design could be dispensed with for the closed loop design. Any enhancement to the performance of the DGE by using a closed loop design will depend upon the accuracy of the spectrum analyzer.

It should be noted that while most parts of the system can be grown on the same substrate using well established Si processes, the nonlinear material requires a separate growing process.

Referring once again to the preferred embodiment as described in association with FIG. 1, the following outlines a specific example to illustrate one set of possible parameters for the preferred embodiment. In general countless other sets of parameters for the working of the invention are readily producible by skilled practitioners in the art. Material of alternating layers: disperse red 1 ($n_0$=1.51, $n_{n1}$=1.7e-6) and methyl orange ($n_0$=1.53, $n_{n1}$=−5.7e-6). Effective area ($A_{eff}$) of the MUX and DEMUX as well as the nonlinear optical limiter: typically 6×6 $\mu m^2$. Laser diode output: 0 dBm. EVOA and coupler loss: 3 dB. EVOA tuning range: 10 dB. The designed gratings parameters for use in the specific example are as follows: number of stacked-layers 500. Output limiting power $$\frac{n_{01} - n_{02}}{|n_{nl1}| + |n_{nl2}|} \cdot A_{eff} = -0.119 \text{ dBm}$$

which results in a dynamic range of (limiting power−maximum power from laser diode) to (limiting power−minimum power from laser diode)=−3 dBm to −13 dBm. Layer thickness: (for λ=1550.12 nm) $d_1$=0.3942 $\mu m$, $d_2$=0.3914 $\mu m$.

Numerous modifications and variations of the present invention are possible in light of the above teachings. It is therefore to be understood that within the scope of the appended claims, the invention may be practised otherwise than as specifically described herein.

I claim:

1. An apparatus for equalizing channel powers of a multichannel optical signal comprising:
    an optical demultiplexer for demultiplexing the multichannel optical signal into a plurality of single channel optical signals,
    for each single channel optical signal a respective nonlinear optical limiter which is adapted to limit the single channel optical signal to produce a limited single channel optical signal; and
    an optical multiplexer for multiplexing the limited single channel optical signals to produce an equalized multichannel optical signal, the apparatus further comprising:
    for each single channel optical signal a respective bias optical signal source providing to the nonlinear optical limiter a respective bias optical signal of a wavelength different from each of the single channel optical signals, each bias optical signal having a power, each limited single channel optical signal having a power which has a dynamic range;
    wherein the power of each bias optical signal controls the dynamic range of the power of the respective limited single channel optical signal produced by the respective nonlinear optical limiter.

2. An apparatus according to claim 1 further comprising:
    for each single channel optical signal a respective optical combiner;
    wherein each optical combiner combines the respective single channel optical signal with the respective bias optical signal before they are input into the respective nonlinear optical limiter.

3. An apparatus according to claim 1 further comprising:
    an isolator adapted to absorb any power of the single channel optical signals which are reflected from the respective nonlinear optical limiter.

4. An apparatus according to claim 3 wherein the nonlinear optical limiters are Bragg gratings comprising nonlinear Kerr materials.

5. An apparatus according to claim 1 further comprising:

for each single channel optical signal a respective isolator adapted to absorb any power of the single channel optical signals which are reflected from the respective nonlinear optical limiter.

6. An apparatus according to claim 5 wherein the nonlinear optical limiters are Bragg gratings comprising nonlinear Kerr materials.

7. An apparatus according to claim 1 wherein the nonlinear optical limiters are absorptive nonlinear optical limiters.

8. An apparatus according to claim 1 wherein the nonlinear optical limiters are Bragg gratings comprising nonlinear Kerr materials.

9. An apparatus according to claim 1 further comprising:

an equalization analyzer; and a bias power controller;

wherein the equalization analyzer determines a respective power measurement for each limited single channel optical signal, the bias power controller controlling the power of each bias optical signal as a function of the power measurements.

10. An apparatus according to claim 1 wherein each nonlinear optical limiter has a limit transmission power such that the limited single channel optical signal is limited to a power less than or equal to the limit transmission power.

11. An apparatus according to claim 10 wherein each nonlinear optical limiter is adapted to produce a limited single channel optical signal according to an optical limiting power transfer curve applied to the respective single channel optical signal, said optical limiting power transfer curve providing a piecewise increasing monotonic transmitted power function portion when incident light upon the nonlinear optical limiter has a power less than an incident light critical power, and providing a relatively flat transmitted power function portion when incident light upon the nonlinear optical limiter has a power greater than the incident light critical power, and wherein the limit transmission powers of the nonlinear optical limiters are defined by said relatively flat transmitted power function portion.

12. An apparatus according to claim 11 wherein the piecewise increasing monotonic transmitted power function portion has a steeper transmitted power function portion having a slope of greater than one whereby sides of optical pulses of the respective single channel optical signal are corrected.

13. An apparatus according to claim 12 wherein the piecewise increasing monotonic transmitted power function portion has a transmitted power function portion which limits the power of the respective single channel optical signal to an insignificant transmission power for incident light upon the nonlinear optical limiter having a power less than an incident light power threshold, wherein the incident light power threshold is less than said incident light critical power.

14. A method of equalizing channel powers of a multichannel optical signal including:

demultiplexing the multichannel optical signal into a plurality of single channel optical signals, for each single channel optical signal, producing a limited single channel optical signal using a respective nonlinear optical limiter which is adapted to limit the single channel optical signal; and multiplexing the limited single channel optical signals to produce an equalized multichannel optical signal, the method further comprising:

for each single channel optical signal, providing to the respective nonlinear optical limiter a respective bias optical signal of a wavelength different from each of the single channel optical signals, each bias optical signal having a power, each limited single channel optical signal having a power which has a dynamic range; and controlling the power of each bias optical signal to control the dynamic range of the power of the respective limited single channel optical signal.

15. A method according to claim 14 further including:

combining the respective single channel optical signal with the respective bias optical signal before producing the limited single channel optical signal.

16. A method according to claim 14 further including:

absorbing any power of the single channel optical signals which are reflected from the nonlinear optical limiters.

17. A method according to claim 14 wherein the nonlinear optical limiters are absorptive nonlinear optical limiters.

18. A method according to claim 14 wherein the nonlinear optical limiters are Bragg gratings comprising nonlinear Kerr materials.

19. A method according to claim 14 further including:

determining a respective power measurement for each limited single channel optical signal; and controlling the power of each bias optical signal as a function of the power measurements.

20. A method according to claim 14 wherein each nonlinear optical limiter has a limit transmission power such that the limited single channel optical signal is limited to a power less than or equal to the limit transmission power.

21. A method according to claim 20 wherein each nonlinear optical limiter is adapted to produce a limited single channel optical signal according to an optical limiting power transfer curve applied to the respective single channel optical signal, said optical limiting power transfer curve providing a piecewise increasing monotonic transmitted power function portion when incident light upon the nonlinear optical limiter has a power less than an incident light critical power, and providing a relatively flat transmitted power function portion when incident light upon the nonlinear optical limiter has a power greater than the incident light critical power, and wherein the limit transmission powers of the nonlinear optical limiters are defined by said relatively flat transmitted power function portion.

22. A method according to claim 21 wherein the piecewise increasing monotonic transmitted power function portion has a steeper transmitted power function portion having a slope of greater than one whereby sides of optical pulses of the respective single channel optical signal are corrected.

23. A method according to claim 22 wherein the piecewise increasing monotonic transmitted power function portion has a transmitted power function portion which limits the power of the respective single channel optical signal to an insignificant transmission power for incident light upon the nonlinear optical limiter having a power less than an incident light power threshold, wherein the incident light power threshold is less than said incident light critical power.

* * * * *